(12) United States Patent  
Okonogi et al.

(10) Patent No.: US 12,056,839 B2  
(45) Date of Patent: Aug. 6, 2024

(54) IMAGE PROCESSING APPARATUS, IMAGE PROCESSING METHOD, AND RECORDING MEDIUM

(71) Applicant: Socionext Inc., Kanagawa (JP)

(72) Inventors: Katsuyuki Okonogi, Yokohama (JP); Takayuki Kato, Yokohama (JP)

(73) Assignee: SOCIONEXT INC., Kanagawa (JP)

(*) Notice: Subject to any disclaimer, the term of this patent is extended or adjusted under 35 U.S.C. 154(b) by 11 days.

(21) Appl. No.: 17/847,985

(22) Filed: Jun. 23, 2022

(65) Prior Publication Data

US 2022/0327793 A1 Oct. 13, 2022

Related U.S. Application Data

(63) Continuation of application No. PCT/JP2019/051634, filed on Dec. 27, 2019.

(51) Int. Cl.
*G06T 19/20* (2011.01)
*G06T 19/00* (2011.01)
(Continued)

(52) U.S. Cl.
CPC .......... *G06T 19/20* (2013.01); *G06T 19/006* (2013.01); *G06V 10/16* (2022.01); *G06V 20/64* (2022.01); *G06T 2219/2021* (2013.01)

(58) Field of Classification Search
CPC .......... G06T 19/20; G06T 19/006; G06T 2219/2021; G06V 20/64; G06V 10/16
See application file for complete search history.

(56) References Cited

U.S. PATENT DOCUMENTS

2014/0055487 A1 2/2014 Kiyo et al.
2014/0204120 A1* 7/2014 Moteki ................. G06T 19/006
345/633
(Continued)

FOREIGN PATENT DOCUMENTS

JP 2013-207637 A 10/2013
JP 2014-041398 A 3/2014
(Continued)

OTHER PUBLICATIONS

International Search Report (ISR) dated Mar. 24, 2020 issued in International Patent Application No. PCT/JP2019/051634, with English translation.
(Continued)

*Primary Examiner* — Michelle Chin
(74) *Attorney, Agent, or Firm* — Rimon P.C.

(57) ABSTRACT

An image processing apparatus according to one aspect includes a hardware processor connected to a memory. The hardware processor performs a process including: acquiring a plurality of captured images whose capturing areas overlap with one another; determining whether an object is included in an overlap portion of adjacent ones of the plurality of captured images in a projected image, the projected image being obtained by projecting the plurality of captured images onto a reference projection plane, the reference projection plane being an image projection plane virtually disposed in a virtual space corresponding to a real space; and performing an adjustment process on an overlap area of the reference projection plane, the overlap area including the object on the reference projection plane and corresponding to the overlap portion including the object.

18 Claims, 24 Drawing Sheets

(51) Int. Cl.
    *G06V 10/10*       (2022.01)
    *G06V 20/64*       (2022.01)

(56) References Cited

U.S. PATENT DOCUMENTS

| | | |
|---|---|---|
| 2015/0130942 A1 | 5/2015 | Fujita et al. |
| 2017/0006234 A1 | 1/2017 | Higuchi et al. |
| 2017/0096106 A1 | 4/2017 | Higuchi et al. |
| 2019/0005715 A1* | 1/2019 | Tung .................. G06T 19/20 |
| 2019/0026557 A1 | 1/2019 | Watanabe et al. |
| 2020/0358992 A1* | 11/2020 | Ishii .................. G06T 3/005 |
| 2022/0327793 A1 | 10/2022 | Okonogi et al. |

FOREIGN PATENT DOCUMENTS

| | | |
|---|---|---|
| JP | 2015-192198 A | 11/2015 |
| JP | 2017-068826 A | 4/2017 |
| JP | 2019-185381 A | 10/2019 |
| JP | 7367776 B2 | 10/2023 |
| WO | 2013/175753 A1 | 11/2013 |
| WO | 2015/194501 A1 | 12/2015 |

OTHER PUBLICATIONS

Written Opinion of the International Searching Authority dated Mar. 24, 2020 issued in International Patent Application No. PCT/JP2019/051634, with English translation.

\* cited by examiner

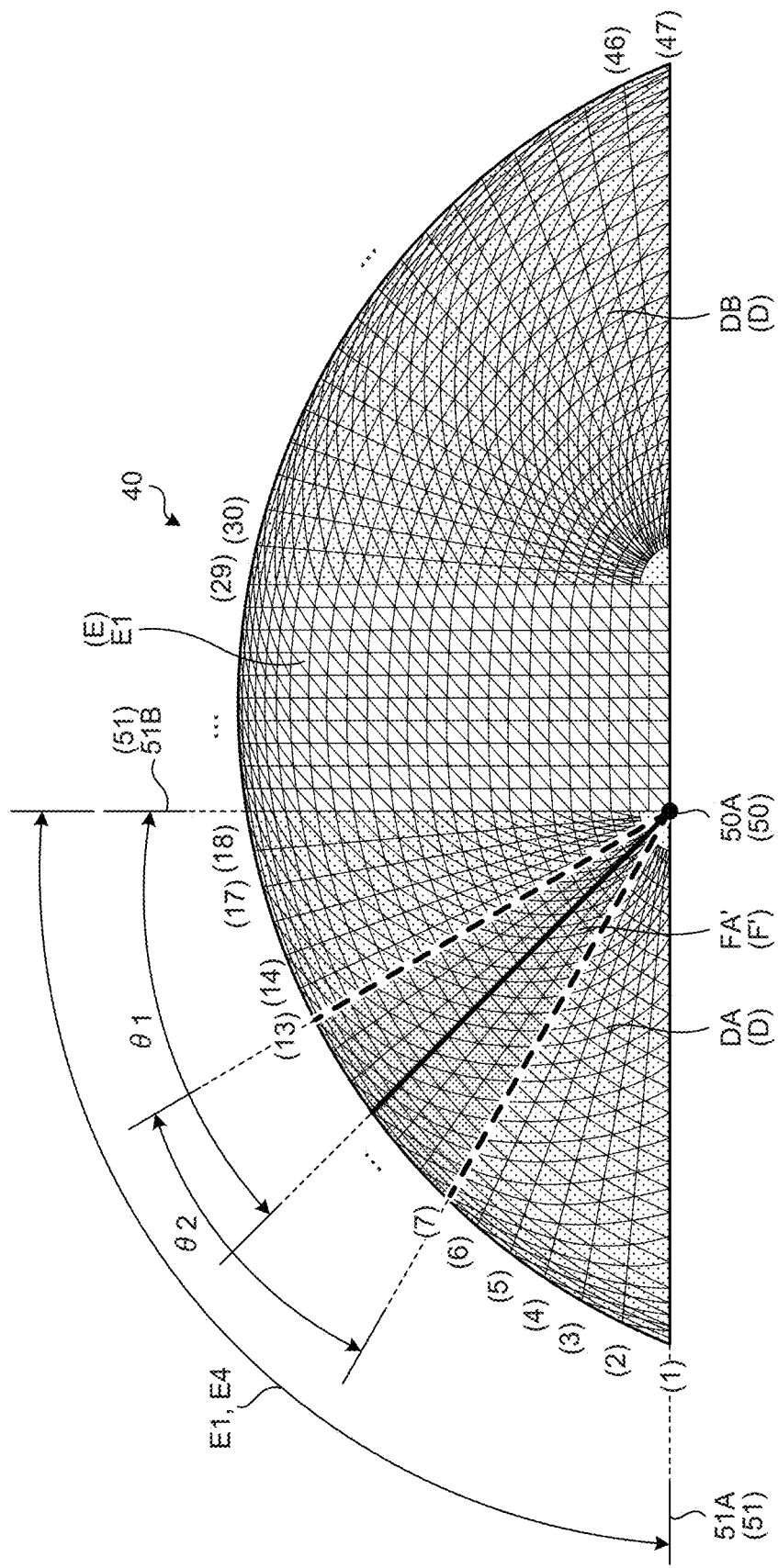

IMAGE PROCESSING APPARATUS, IMAGE PROCESSING METHOD, AND RECORDING MEDIUM

CROSS-REFERENCE TO RELATED APPLICATIONS

This application is a continuation of International Application No. PCT/JP2019/051634, filed on Dec. 27, 2019, the entire contents of which are incorporated herein by reference.

FIELD

The present disclosure relates generally to an image processing apparatus, an image processing method, and a recording medium.

BACKGROUND

A related art has been disclosed, in which a projected image is generated by projecting multiple captured images around a moving body onto a virtual projection plane. Also, a related art has been disclosed, in which a distance to an object around a moving body is detected with a sensor, and a projection plane is deformed in accordance with the detected distance (for example, JP 2013-207637A).

However, an object is sometimes present in an overlap portion of the captured images projected onto a projection plane. In such a case, phenomena including absence or blurring of the object image may occur in the region of the projected image onto which the object is projected. The foregoing related art fails to disclose the case where an object is present in an overlap portion of captured images and also fails to disclose the phenomena including the absence or blurring of object images.

SUMMARY

An image processing apparatus according to one aspect of the present disclose includes a hardware processor connected to a memory. The hardware processor is configured to perform a process including: acquiring a plurality of captured images whose capturing areas overlap with one another; determining whether an object is included in an overlap portion of adjacent ones of the plurality of captured images in a projected image, the projected image being obtained by projecting the plurality of captured images onto a reference projection plane, the reference projection plane being an image projection plane virtually disposed in a virtual space corresponding to a real space; and performing an adjustment process on an overlap area of the reference projection plane, the overlap area including the object on the reference projection plane and corresponding to the overlap portion including the object.

BRIEF DESCRIPTION OF THE DRAWINGS

FIG. 11A is an explanatory diagram of adjustment of composite coefficients according to the embodiment;

DETAILED DESCRIPTION

With reference to the accompanying drawings, a description will be given in detail below of some embodiments of an image processing apparatus, an image processing method, and a recording medium, which are disclosed in this application. It should be noted that the following embodiments are not intended to limit the disclosed technique. In addition, the individual embodiments can be appropriately combined together to the extent that the processing contents do not contradict one another.

Figure 1:
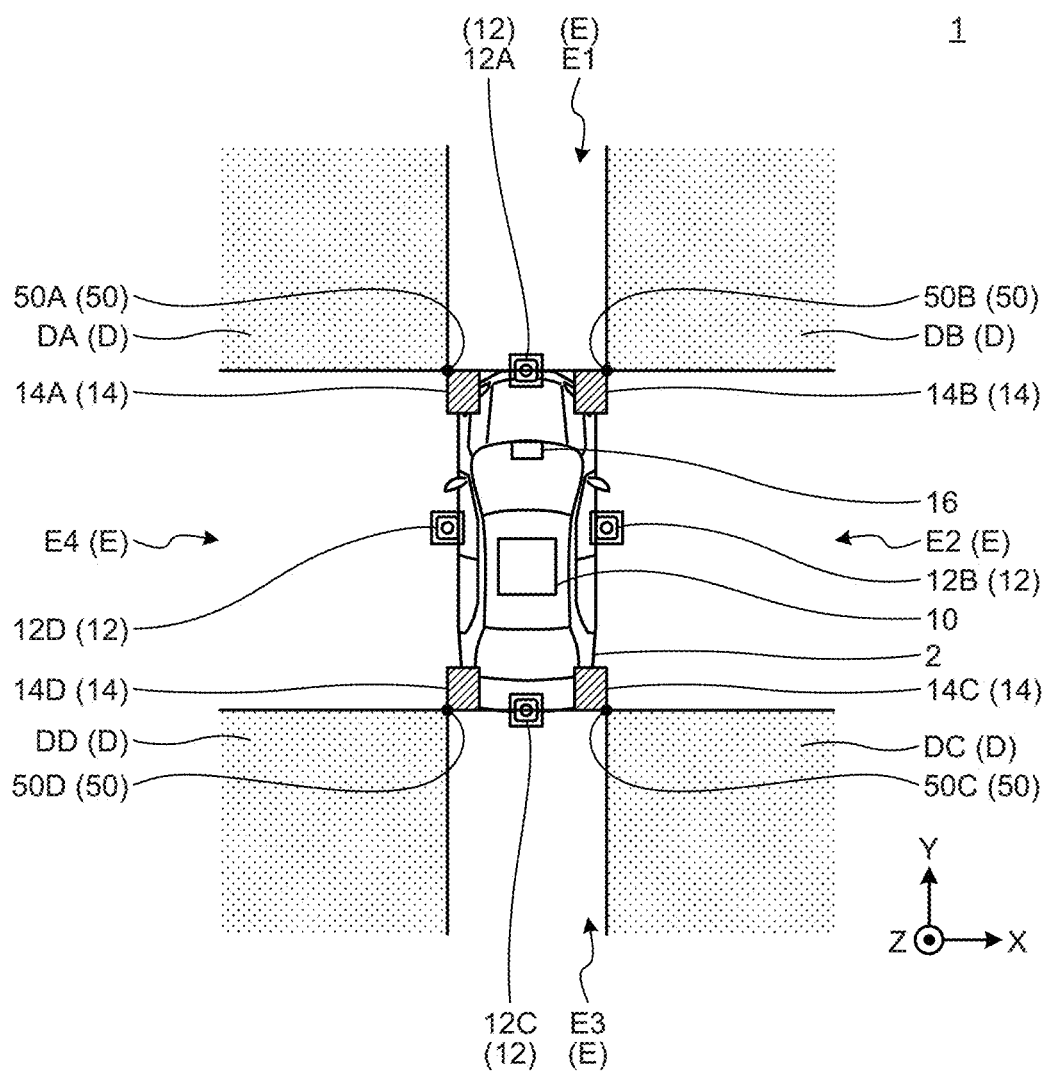
FIG. 1 is a diagram of an overall configuration of an image processing system according to an embodiment.

FIG. 1 is a diagram of an example of an overall configuration of an image processing system 1 in the present embodiment. The image processing system 1 includes an image processing apparatus 10, image capturing units 12, detectors 14, and a display unit 16. The image processing apparatus 10, the image capturing units 12, the detectors 14, and the display unit 16 are connected together so as to transmit/receive data or signals.

In the present embodiment, a mode in which the image processing apparatus 10, the image capturing units 12, the detectors 14, and the display unit 16 are mounted on a moving body 2 will be described as an example.

The moving body 2 refers to an object that can move. Examples of the moving body 2 include vehicles, flying objects (manned airplanes and unmanned airplanes (e.g., unmanned aerial vehicles (UAVs) and drones)), and robots. For example, the moving body 2 may be a moving body that moves in accordance with a human driving operation or a moving body that can automatically (autonomously) move not through a human driving operation. In the present embodiment, a case where the moving body 2 is a vehicle will be described as an example. For example, the vehicle may be a two-wheeled automobile, a three-wheeled automobile, or a four-wheeled automobile. In the present embodiment, a case where the vehicle is an autonomously movable four-wheeled vehicle will be described as an example.

The present embodiment is not limited to a mode in which all the image processing apparatus 10, the image capturing units 12, the detectors 14, and the display unit 16 are mounted on the moving body 2. The image processing apparatus 10 may be mounted on a stationary object. The stationary object refers to an object fixed to the ground. The stationary object may be an object that cannot move or an object in a state of being stationary on the ground. For example, the stationary object may be a traffic light, a parked vehicle, or a road sign. The image processing apparatus 10 may be mounted on a cloud server that performs processes via a cloud.

The image capturing units 12 capture images of an area around the moving body 2, acquiring captured image data. In the following description, the captured image data will be simply referred to as captured images. For example, each image capturing unit 12 may be a known digital camera. The capturing of an image refers to processing of converting an image of a subject formed by an optical system such as a lens into an electric signal. The image capturing units 12 output the captured images to the image processing apparatus 10.

In the present embodiment, a mode in which four image capturing units 12 (an image capturing unit 12A to an image capturing unit 12D) are mounted on the moving body 2 will be described as an example. The image capturing units 12 (image capturing unit 12A to image capturing unit 12D) capture images of subjects in respective image capturing areas E (an image capturing area E1 to an image capturing area E4), thereby acquiring captured images. It should be noted that the number of image capturing units 12 may be two or more and is not limited to four accordingly. In the present embodiment, a mode in which the image processing system 1 includes four image capturing units 12 will be described as an example.

The image capturing units 12 described above have mutually different image capturing directions. More specifically, the image capturing directions of the image capturing units 12 are pre-adjusted such that the image capturing areas E overlap with one another but the image capturing areas E are not overlaid with one another. Thus, when mutually different image capturing units 12 capture images of respective image capturing areas E, for example, adjacent image capturing areas E have an overlap area D in which the image capturing areas E overlap with each other. In short, the captured images of the image capturing areas E have overlap portions in relation to the corresponding overlap areas D in which adjacent captured images overlap with each other.

In FIG. 1, an overlap area DA to an overlap area DD is illustrated as an example of overlap areas D. The overlap area DA corresponds to the overlap area D of the image capturing area E4 and the image capturing area E1. The overlap area DB corresponds to the overlap area D of the image capturing area E1 and the image capturing area E2. The overlap area DC corresponds to the overlap area D of the image capturing area E2 and the image capturing area E3. The overlap area DD corresponds to the overlap area D of the image capturing area E3 and the image capturing area E4.

The detectors 14 detect position information on detection points around the moving body 2. The detection points refer to points in a real space, which are to be individually observed by the detectors 14. For example, the detectors 14 may irradiate an area around the detector 14 with light, radio waves, or sound waves, and then receive reflected light rays or reflected waves reflected at reflection points. These reflection points correspond to the detection points.

The position information on a detection point refers to information indicating the position of a detection point in the real space. The real space refers to a three-dimensional space. For example, the position information on a detection point may be information including at least one of a distance from a detector 14 to the detection point and a direction to the detection point with respect to the detector 14. For example, these distance and direction can be expressed as a vector indicating a relative position of a detection point with respect to the detector 14.

For example, each detector 14 may be a three-dimensional (3D) scanner, a two-dimensional (2D) scanner, a distance sensor (millimeter-wave radar or laser sensor), a sonar sensor that detects an object with sound waves, or an ultrasonic sensor. For example, the laser sensor may be a three-dimensional laser imaging detection and ranging (LIDAR) sensor. Alternatively, each detector 14 may be a device that employs a ranging technique (structure from motion (SfM), etc.) for measuring a distance from images captured by a monocular camera or a device that employs a ranging technique (stereo camera, etc.) for measuring a distance based on images captured by cameras.

In the present embodiment, a mode in which four detectors 14 (a detector 14A to a detector 14D) are mounted on the moving body 2 will be described as an example. The detection areas of the detectors 14 (detector 14A to detector 14D) are at least partly different from one another. In the present embodiment, the detection areas of the detectors 14 (detector 14A to detector 14D) include at least a part of the image capturing area E of each of the image capturing units 12 (image capturing units 12A to 12D). In the present embodiment, a mode in which the detector 14A to the detector 14D are provided on both sides of the front portion of the moving body 2 and both sides of the rear portion of the moving body 2 will be described as an example. It should be noted that each detector 14 is required to detect one or more detection points within the detection area covering at least a corresponding image capturing area E, whereas the number and installation positions of the detectors 14 are not limited.

The display unit 16 displays various information. For example, the display unit 16 may be a liquid crystal display (LCD), an organic electro-luminescence (EL) display, or other display.

Figure 2:
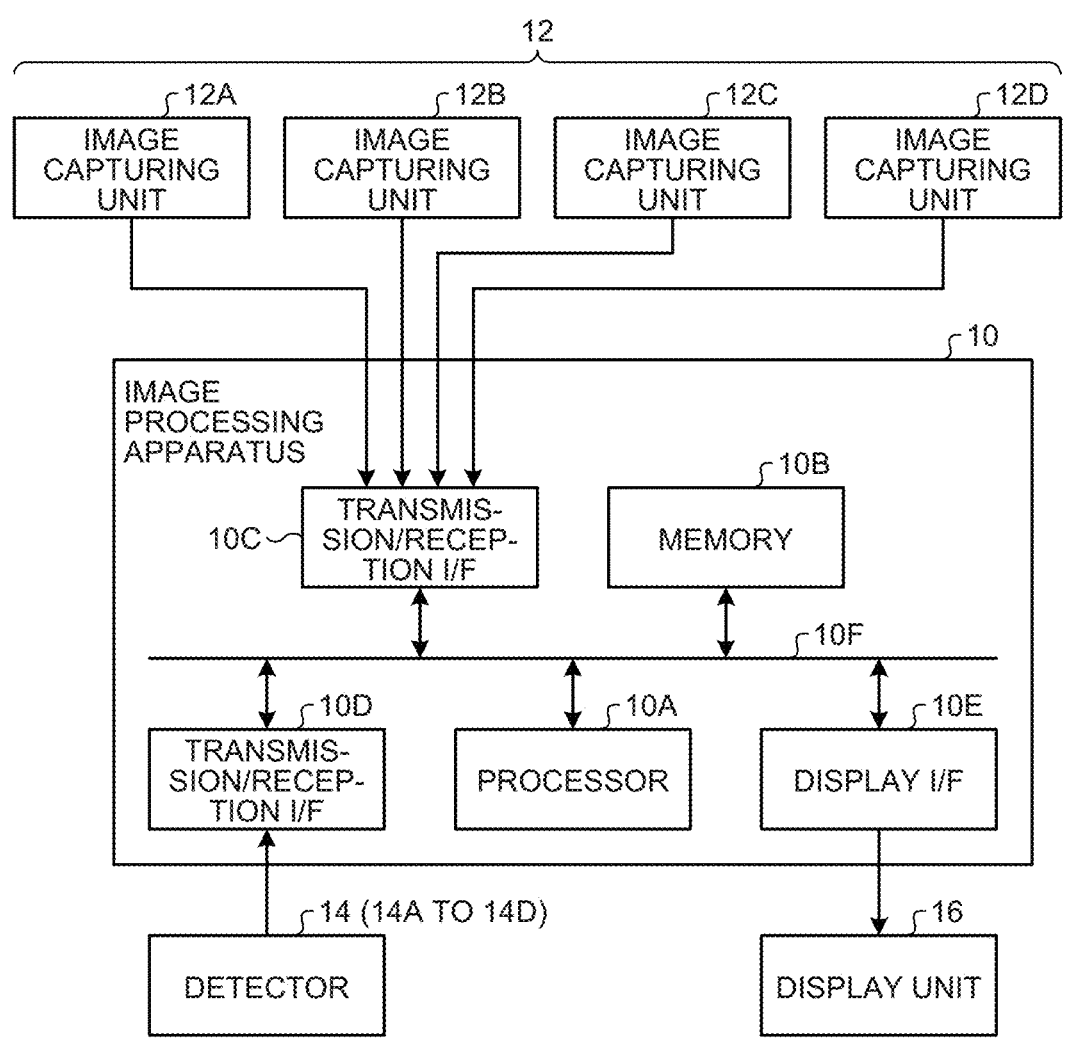
FIG. 2 is a diagram of a hardware configuration of an image processing apparatus according to the embodiment.

Next, a hardware configuration of the image processing apparatus 10 will be described. FIG. 2 is a diagram of an example of a hardware configuration of the image processing apparatus 10.

The image processing apparatus 10 includes a processor 10A, a memory 10B, a transmission/reception interface (I/F) 10C, a transmission/reception I/F 10D, and a display I/F 10E. The processor 10A, the memory 10B, the transmission/reception I/F 10C, the transmission/reception I/F 10D, and the display I/F 10E are interconnected via a bus 10F to constitute a hardware configuration using a normal computer.

The processor 10A (an example of the hardware processor) may be a micro-processing unit (MPU), which is an arithmetic device that controls the image processing apparatus 10. The processor 10A is an example of a hardware processor. Examples of the memory 10B include random access memory (RAM), read-only memory (ROM), flash memory, and other semiconductor memory devices. For example, the ROM or the flash memory may store programs that realize various processes to be performed by the processor 10A. For example, the RAM stores data necessary for various processes to be performed by the processor 10A. The transmission/reception I/F 10C serves as an interface connected to the image capturing units 12 to transmit and receive data. The transmission/reception I/F 10D serves as an interface connected to the detectors 14 to transmit and receive data. The display I/F 10E serves as an interface connected to the display unit 16 to transmit and receive data.

Computer programs for use in executing image processes to be performed by the image processing apparatus 10 in the present embodiment are incorporated in advance in a ROM, for example, and are provided. The programs to be executed by the image processing apparatus 10 in the present embodiment may be stored on a recording medium in a file format by which the program can be installed in or executed by the image processing apparatus 10 and may be provided. The recording medium may be a computer-readable medium. The recording medium may be a compact disc (CD)-ROM, a flexible disk (FD), a CD-R (recordable), a digital versatile disk (DVD), a universal serial bus (USB) memory, a secure digital (SD) card, or other medium.

Next, a functional configuration of the image processing apparatus 10 will be described.

Figure 3:
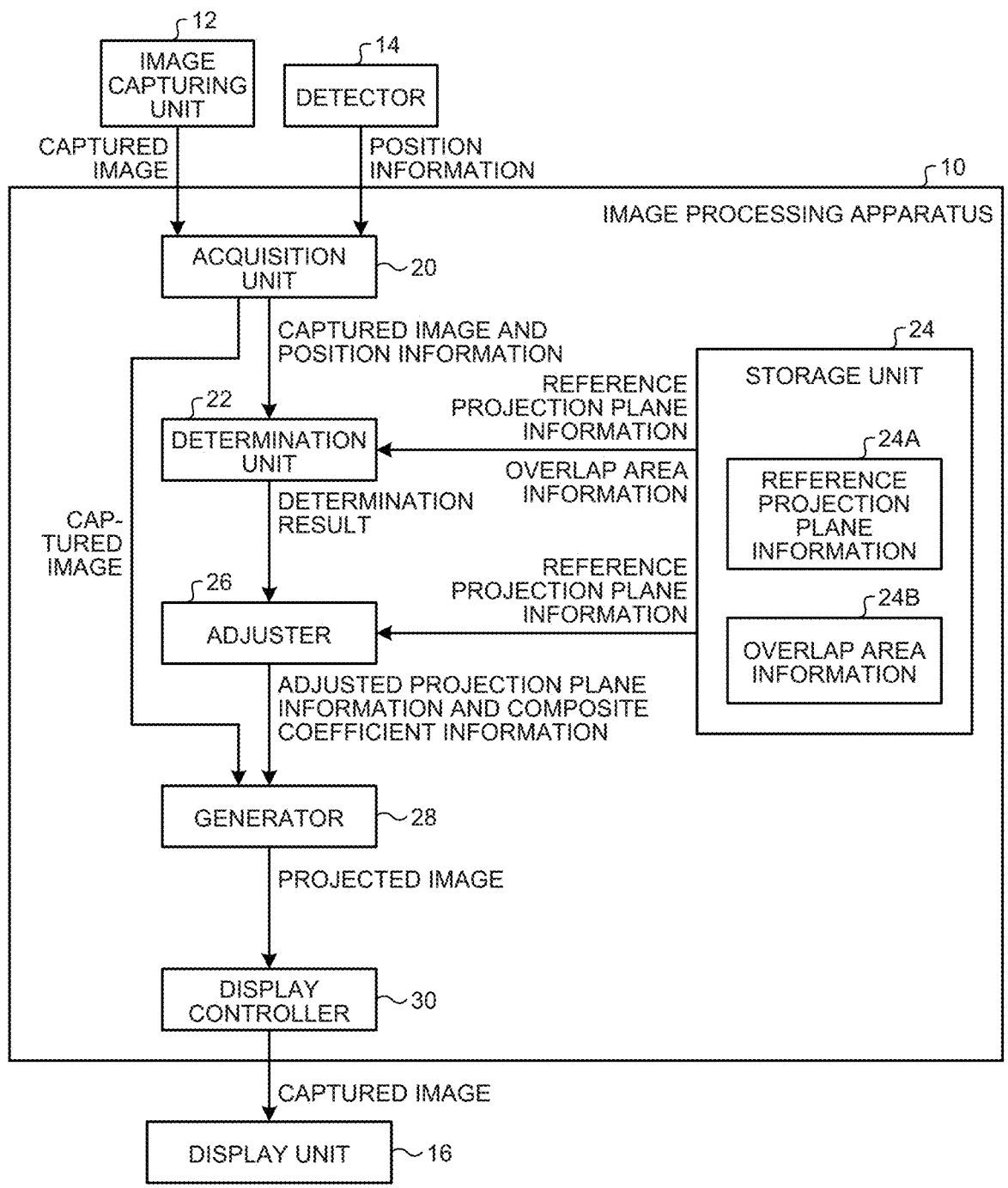
FIG. 3 is a diagram of a functional configuration of the image processing apparatus according to the embodiment.

FIG. 3 is a diagram of an example of the functional configuration of the image processing apparatus 10. It should be noted that FIG. 3 illustrates the image capturing units 12, the detectors 14, and the display unit 16 in addition to the image processing apparatus 10, for the purpose of clarifying the data input/output relationship.

The image processing apparatus 10 in the present embodiment generates a projected image by projecting captured images acquired by the image capturing units 12 onto an adjusted projection plane, which is obtained by adjusting a reference projection plane.

The reference projection plane refers to a projection plane having a predetermined reference shape. The projection plane refers to an image projection plane virtually disposed in a virtual space corresponding to the real space.

Figure 4:
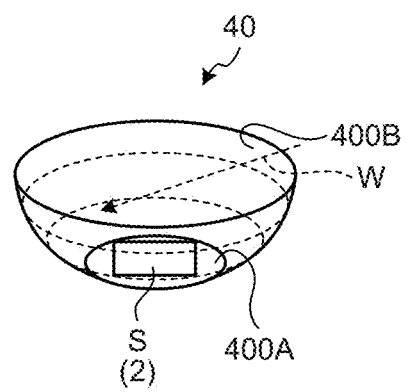
FIG. 4 is a schematic diagram of an example of a reference projection plane according to the embodiment.

FIG. 4 is a schematic diagram of an example of a reference projection plane 40. Examples of a shape of the reference projection plane 40 include a bowl shape and a cylindrical shape. In FIG. 4, the reference projection plane 40 having a bowl shape is illustrated as an example.

The bowl shape refers to a shape that includes a bottom 400A being a plane face having a circular shape, and a side wall 400B extending to the bottom 400A. The circular shape refers to a shape including a perfectly circular shape, a circular shape, and an elliptical shape. The side wall 400B has a shape in which one side extends to the bottom 400A and the other side has an opening. In addition, the side wall 400B has a shape in which a diameter of a horizontal cross section increases from the bottom 400A toward the opening on the other side. The horizontal cross section refers to a cross section expanding in horizontal directions, which are orthogonal to the vertical direction of the bottom 400A.

The cylindrical shape refers to a shape including the bottom 400A having a circular shape and the side wall 400B extending to the bottom 400A. The side wall 400B of the reference projection plane 40 having a cylindrical shape may have a tubular shape in which one side has an opening extending to the bottom 400A and the other side has an opening. In this case, the side wall 400B of the reference projection plane 40 having a cylindrical shape has a shape in which the diameter of the horizontal cross section is substantially constant from the bottom 400A toward the opening on the other side.

In the present embodiment, a case where the shape of the reference projection plane 40 is a bowl shape will be described as an example. The reference projection plane 40 is a stereoscopic model virtually formed in a virtual space. Further, the bottom 400A is a face substantially flush with the ground below the moving body 2, and the central area of the bottom 400A is defined at a reference position S of the moving body 2.

For example, the range of the center region of the bottom 400A may be a range covered by an icon that schematically represents the moving body 2. For example, the icon may be a rectangular symbol formed by a straight line that connects both sides of the front portion of the moving body 2, a straight line that connects both sides of the rear portion, and a pair of straight lines that extends along the entire length of the moving body 2. The center of the horizontal cross section of the icon preferably coincides with the center of the bottom 400A. The reference position S refers to a position of the icon of the moving body 2 which is virtually disposed on the bottom 400A of the reference projection plane 40. The reference position S is defined by the position and range of the icon in the virtual space.

Returning to FIG. 3, the description will be continued. The image processing apparatus 10 generates a projected image by projecting multiple captured images acquired by the image capturing units 12 onto the adjusted projection plane, which is obtained by performing an adjustment process on the reference projection plane 40.

An object is sometimes included in an overlap portion of adjacent captured images projected onto the reference projection plane 40. The object refers to an object detected as one or more groups of detection points by the detectors 14 and may be a three-dimensional object or a planar object, for example. The three-dimensional object refers to an object having a three-dimensional shape. The three-dimensional object may be a fixed structure such as a pillar, a movable structure such as an automobile or a bicycle, or a creature such as a human being or an animal. The planar object refers to a two-dimensional object. For example, the planar object may be a line formed on the ground. In the present embodiment, a case where the object is a three-dimensional object will be described as an example.

When an object is included in the overlap portion, the object may be absent or the object image may blur in an area of a comparative projected image, or a conventional projected image, onto which the object is projected. The absence of the object means that at least a partial area of the object present in the real space is not present in the area of the projected image onto which the object in the real space is projected. The burring of the object means a state in which two or more images of the object present in the real space overlap one another in the projected image.

Figure 5:
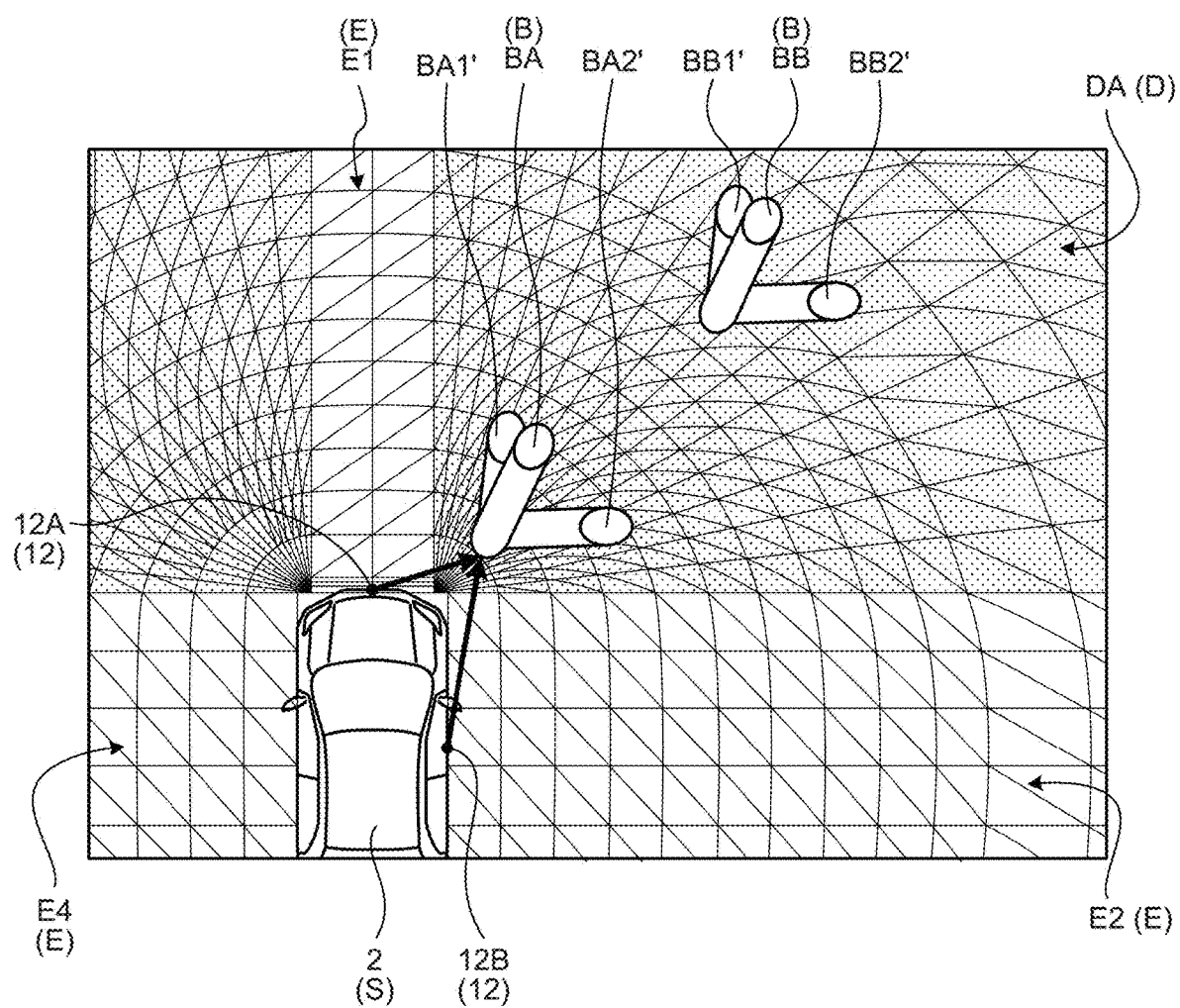
FIG. 5 is a schematic diagram of a comparative projected image according to a conventional technique.

FIG. 5 is a schematic diagram of an example of a comparative projected image 600 in a conventional technique. It is assumed that objects B, each being a three-dimensional object, are included in the overlap area DA between the image capturing area E1 for the image capturing unit 12A and the image capturing area E2 for the image capturing unit 12B. In FIG. 5, an object BA and an object BB are each illustrated as the objects B. The object BA is located closer to the moving body 2 than the object BB is.

In the above case, when a captured image of the object BA acquired by the image capturing unit 12B is projected onto the reference projection plane 40, an image BA1' of the object BA is projected so as to be inclined in a direction away from the near side of the image capturing unit 12B. When a captured image of the object BA acquired by the image capturing unit 12A is projected onto the reference projection plane 40, an image BA2' of the object BA is projected so as to be inclined in a direction away from the near side of the image capturing unit 12A.

Likewise, when a captured image of the object BB acquired by the image capturing unit 12B is projected onto the reference projection plane 40, an image BB1' of the object BB is projected so as to be inclined in a direction away from the near side of the image capturing unit 12B. When a captured image of the object BB acquired by the image capturing unit 12A is projected onto the reference projection plane 40, an image BB2' of the object BB is projected so as to be inclined in a direction away from the near side of the image capturing unit 12A.

As described above, when the captured images of a single object B acquired by different image capturing units 12 are projected onto the reference projection plane 40, the images of the object B are projected onto the reference projection plane 40 while inclined in different directions.

As described later, when a projected image is generated, the following processing is performed. Specifically, on the reference projection plane 40, only the captured image of an image capturing area E1 is projected for a partial region (first region) continued to the image capturing area E1 in the overlap area DA, and only the captured image of an image capturing area E2 is projected for a partial region (second region) continued to the image capturing area E2 in the overlap area DA. Additionally, a composite image is projected for an intermediate region (third region) between the first region and the second region in the overlap area DA. The composite image for the intermediate region is generated by compositing the captured images of the two image capturing areas E1 and E2 constituting the overlap area DA.

According to the conventional technique, when the object BA present close to the moving body 2 within an overlap area D is projected onto the reference projection plane 40, the image BA1' of the object BA may be unsuccessfully projected onto the first region. Likewise, the image BA2' of the object BA may be unsuccessfully projected onto the second region on the reference projection plane 40. The reason is that the image BA1' included in the captured image of the image capturing area E2 is included in the first region on the reference projection plane 40, and the image BA2' included in the captured image of the image capturing area E1 is included in the second region on the reference projection plane 40. As a result, the object BA present close to the moving body 2 within the overlap area D might be absent.

When the object BB present apart from the moving body 2 within the overlap area D is projected onto the reference projection plane 40, both the image BB1' and the image BB2' of the object BB may be projected onto the third region on the reference projection plane 40. The reason is that both the image BA1' included in the captured image of the image capturing area E2 and the image BA2' included in the captured image of the image capturing area E1 are included in the third region on the reference projection plane 40. As a result, the object BB present apart from the moving body 2 within the overlap area D is projected in a blurry manner.

For the above reasons, when the object B is included in an overlap portion of a captured image, the image processing apparatus 10 in the present embodiment performs an adjustment process on an overlap area D on the reference projection plane 40. Details of the image processing apparatus 10 will be described below.

Returning to FIG. 3, the description will be continued. The image processing apparatus 10 includes an acquisition unit 20, a determination unit 22, a storage unit 24, an adjuster 26, a generator 28, and a display controller 30.

Part of all the units described above may be implemented by, for example, causing a processing device such as the processor 10A to execute a program, that is, may be implemented by software. In addition, part of all the units described above may be implemented by hardware such as an integrated circuit (IC), or may be implemented by a combination of software and hardware.

The acquisition unit 20 acquires multiple captured images from the image capturing units 12. As described above, image capturing areas E in each of the captured images overlap with each other. The acquisition unit 20 acquires the position information on detection points from the detectors 14. The detectors 14 (detector 14A to detector 14D) detect the position information on detection points at each timing. Therefore, the acquisition unit 20 acquires the position information on the detection points and the captured images acquired by the image capturing units 12 at each timing.

The acquisition unit 20 outputs the captured images and the position information on the detection points to the determination unit 22. The determination unit 22 receives the captured images and the position information on the detection points from the acquisition unit 20.

The determination unit 22 determines whether the object B is included in an overlap portion of adjacent captured images in a projected image, which is formed by projecting the captured images onto the reference projection plane 40.

For example, the determination unit 22 may determine whether the object B is included in the overlap portion of the adjacent captured images by using the captured images and the position information on the detection points which have been received from the acquisition unit 20, as well as reference projection plane information 24A and overlap area information 24B. As described above, the position information on the detection points refers to information indicating at least one of the distance and direction from each detector 14 to the object B.

The reference projection plane information 24A refers to information indicating the shape of the reference projection plane 40. The overlap area information 24B refers to information indicating the position and the range of an image composite region F defined in each overlap area D on the reference projection plane 40. For example, the image capturing area E for each of the image capturing units 12 may be preset. Therefore, the relative position and range of the overlap area D of each of the image capturing areas E with respect to the moving body 2 are predetermined. The relative position and range of the image composite region F with respect to the moving body 2 can be predetermined.

The storage unit 24 pre-stores the reference projection plane information 24A and the overlap area information 24B. The storage unit 24 stores various data. Examples of the storage unit 24 include semiconductor memory devices such as RAM, ROM, and flash memory, hard disks, and optical disks. In addition, the storage unit 24 may be a storage device provided outside the image processing apparatus 10. Furthermore, the storage unit 24 may be a storage medium that stores or temporarily stores programs and various information that have been downloaded via a local area network (LAN) or the Internet.

The determination unit 22 maps the detection points defined by the position information that have been received from the acquisition unit 20, on the reference projection plane 40 indicated by the reference projection plane information 24A. The mapping means arranging the detection points in the virtual space defined by the reference projection plane 40. The determination unit 22 may employ a known method to identify the positions in the virtual space, which correspond to the directions and the distances defined by the position information on the detection points and may place the detection points at the identified positions.

The determination unit 22 identifies the position and range of an overlap area D on the reference projection plane 40 by using the overlap area information 24B. The determination unit 22 then determines whether any of the detection points constituting the object B is present within the overlap area D. Through this determination process, the determination unit 22 determines whether the object B is included in the overlap area D in the projected image.

The determination unit 22 may identify, with a known method, the group of the detection points constituting the object B by using the position information on the detection points that have been mapped on the reference projection plane 40. For example, the determination unit 22 may identify the group of detection points constituting the object B by performing a matching process on the detection points mapped and the group of detection points constituting a predetermined outer shape of the object B.

Following the above, the determination unit 22 determines whether at least a partial region of the object B constituted by the identified group of detection points is doubly present in the overlap area D, thereby determining whether the object B is included in the overlap area D.

The determination unit 22 outputs, to the adjuster 26, the determination result indicating whether the object B is included in the overlap area D. The adjuster 26 receives the determination result from the determination unit 22.

When the determination result indicates that the object B is included in the overlap area D, the adjuster 26 performs an adjustment process.

The adjustment process refers to a process of adjusting the overlap area D including the object B on the reference projection plane 40. In other words, the adjustment process refers to a process of adjusting an overlap area D including the object B, out of multiple overlap areas D included in the reference projection plane 40.

The adjusting of the overlap area D refers to at least one of a projection plane deformation process by which a component plane that forms the overlap area D on the reference projection plane 40 is deformed and an image composite adjustment process by which the position and range of the image composite region F defined in the overlap area D on the reference projection plane 40 is adjusted.

First, the projection plane deformation process, which is an example of the adjustment process performed by the adjuster 26, will be described.

The projection plane deformation process refers to a process of deforming a shape of the component plane in the overlap area D including the object B on the reference projection plane 40 into a shape that passes a side of the reference position S with respect to the object B. The component plane in the overlap area D including the object B on the reference projection plane 40 refers to a region of a face which forms the overlap area D including the object B, out of the entire area of the reference projection plane 40.

The shape that passes the side of the reference position S with respect to the object B refers to a shape that passes at least the detection point located closest to the reference position S or a shape that passes at least between this detection point and the reference position S, out of the detection points constituting the object B.

FIGS. 6A to 6E are explanatory diagrams of an example of the projection plane deformation process.

Figure 6A:
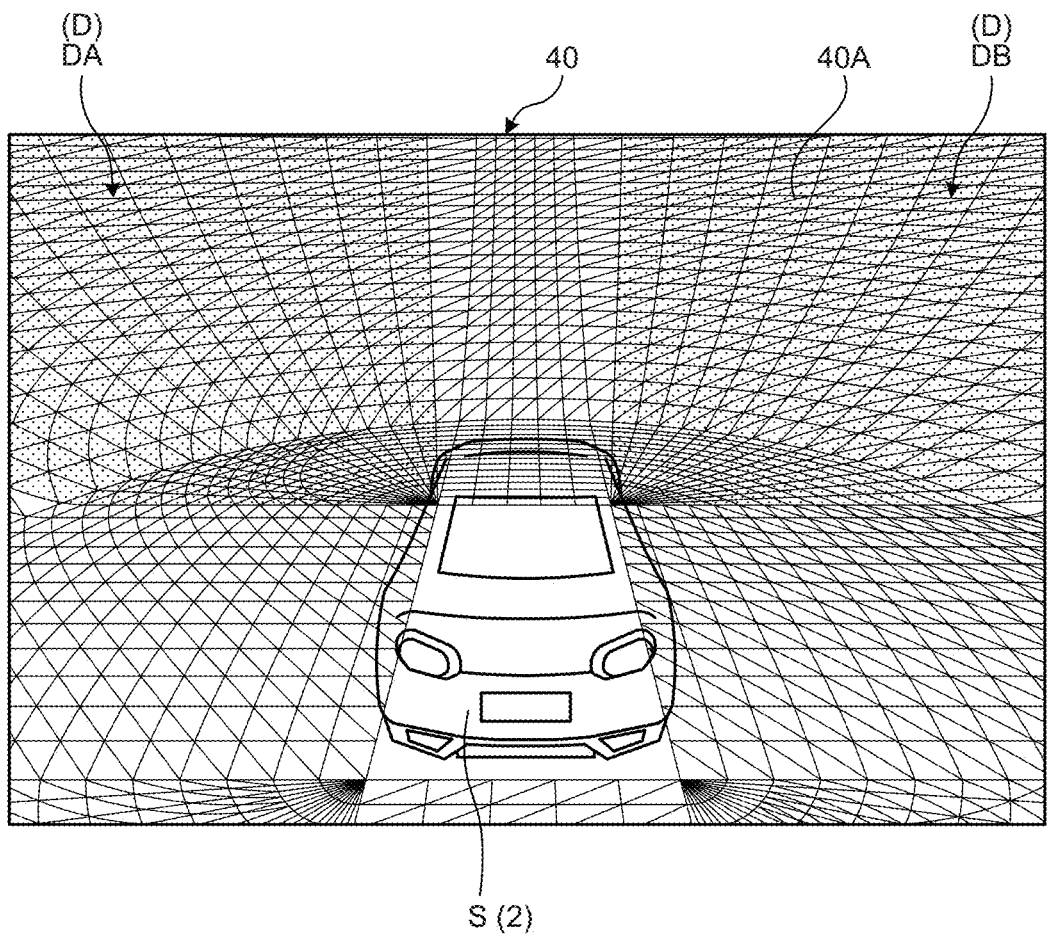
FIG. 6A is an explanatory diagram of a projection plane deformation process according to the embodiment.

FIG. 6A is a diagram of the reference projection plane 40 as viewed from a direction (an arrow W direction depicted in FIG. 4) inclined with respect to the vertical direction. The adjuster 26 performs a deformation process by which a component plane 40A that forms the overlap area D on the reference projection plane 40 is deformed. The component plane 40A is part of component planes of the reference projection plane 40, and is a component plane corresponding to the overlap area D including the object B. The adjuster 26 performs the deformation process on the component plane 40A, thereby generating an adjusted projection plane 42 having an adjusted component plane 42A that passes the side of the reference position S of the moving body 2 with respect to the object B, as illustrated in FIGS. 6B to 6D.

Figure 6B:
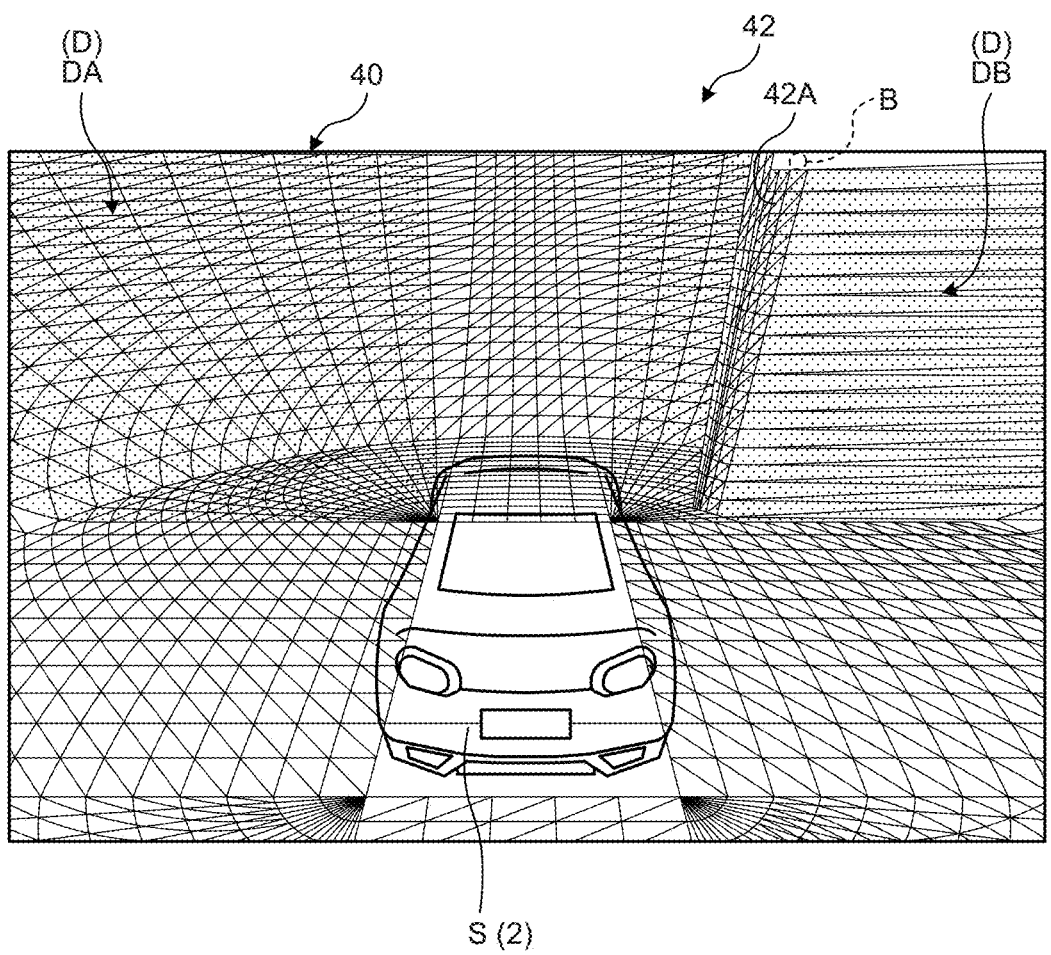
FIG. 6B is an explanatory diagram of the projection plane deformation process according to the embodiment.
Figure 6C:
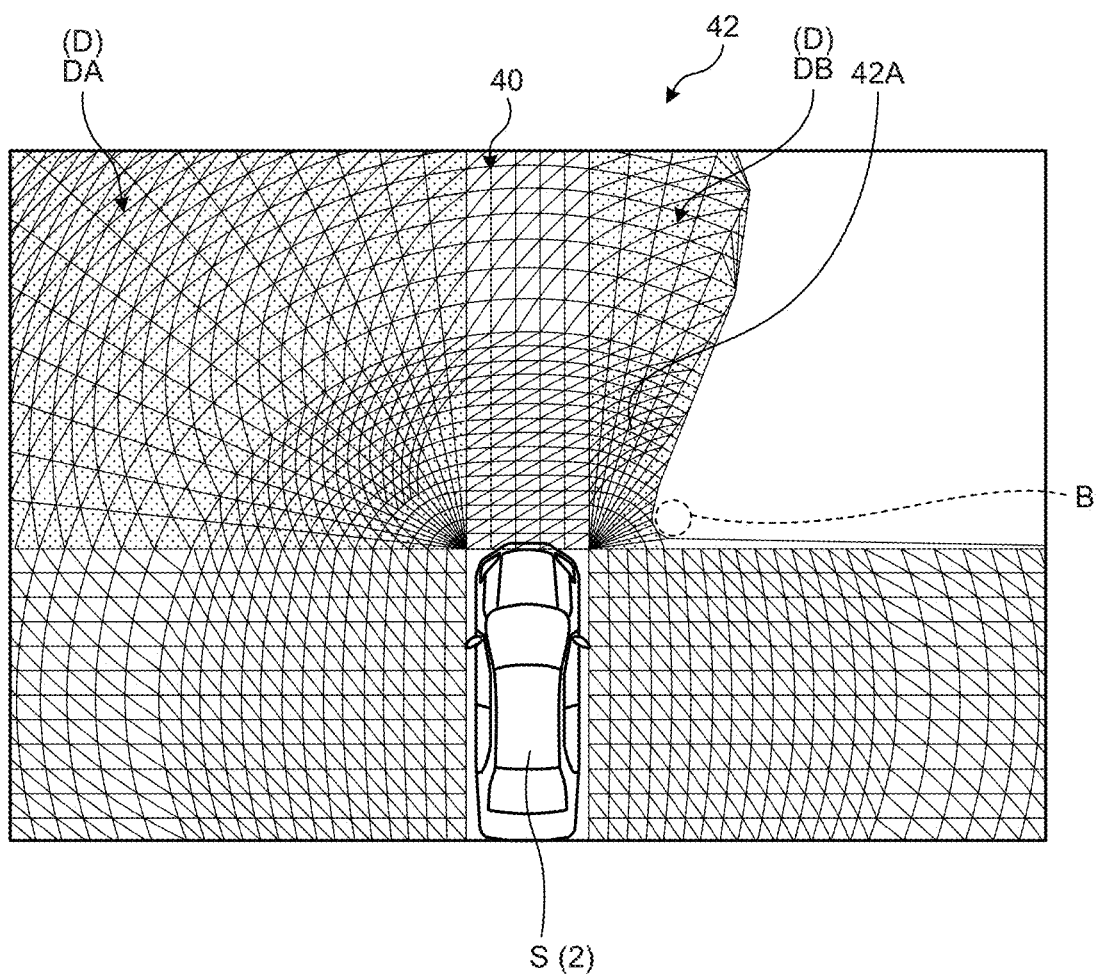
FIG. 6C is an explanatory diagram of the projection plane deformation process according to the embodiment.
Figure 6D:
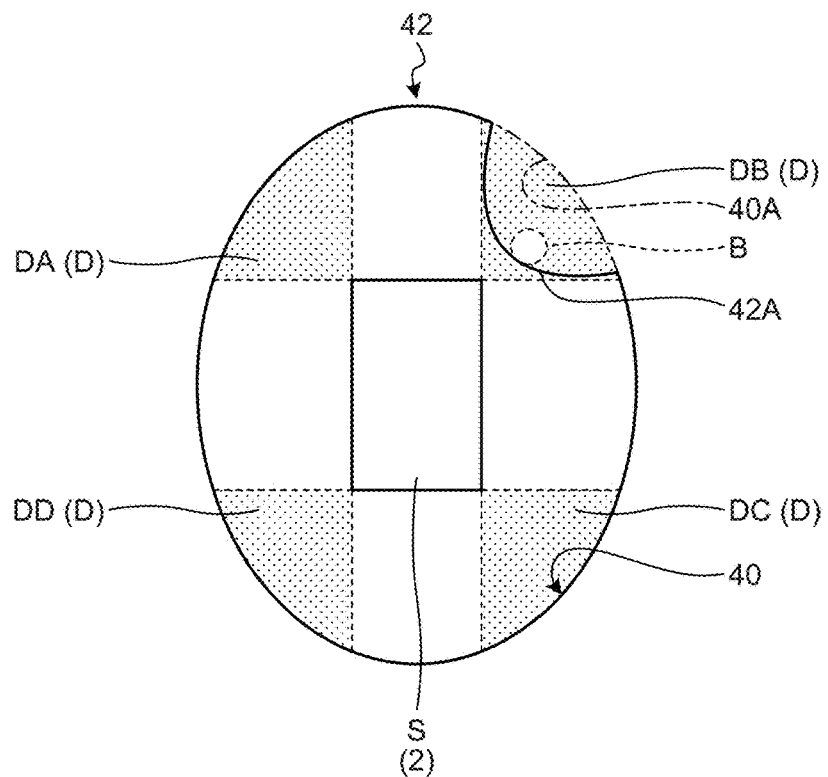
FIG. 6D is an explanatory diagram of the projection plane deformation process according to the embodiment.

FIGS. 6B to 6D illustrate, as an example, a case where the object B is present within the overlap area DB, which is one of the overlap areas D (overlap area DA to overlap area DD) around the moving body 2. FIG. 6B is a diagram of the adjusted projection plane 42 as viewed from a direction (see arrow W direction in FIG. 4) inclined with respect to the vertical direction. FIG. 6C is a plan diagram of the adjusted projection plane 42 as viewed from the vertical direction. FIG. 6D is a schematic diagram of a plan view of the adjusted projection plane 42 as viewed from the vertical direction.

As illustrated in FIG. 6D, the adjuster 26 deforms the component plane 40A that forms the overlap area DB including the object B on the reference projection plane 40 into a shape that passes the side of the reference position S of the moving body 2 with respect to the object B, thereby providing the adjusted component plane 42A. Therefore, the adjusted projection plane 42 corresponds to a projection plane obtained by deforming the component plane 40A that forms the overlap area DB including the object B into the adjusted component plane 42A (see FIGS. 6A to 6D).

In some cases, different overlap areas D each include the object B. In such cases, the adjuster 26 may perform the projection plane deformation process on each of the overlap areas D.

Figure 6E:
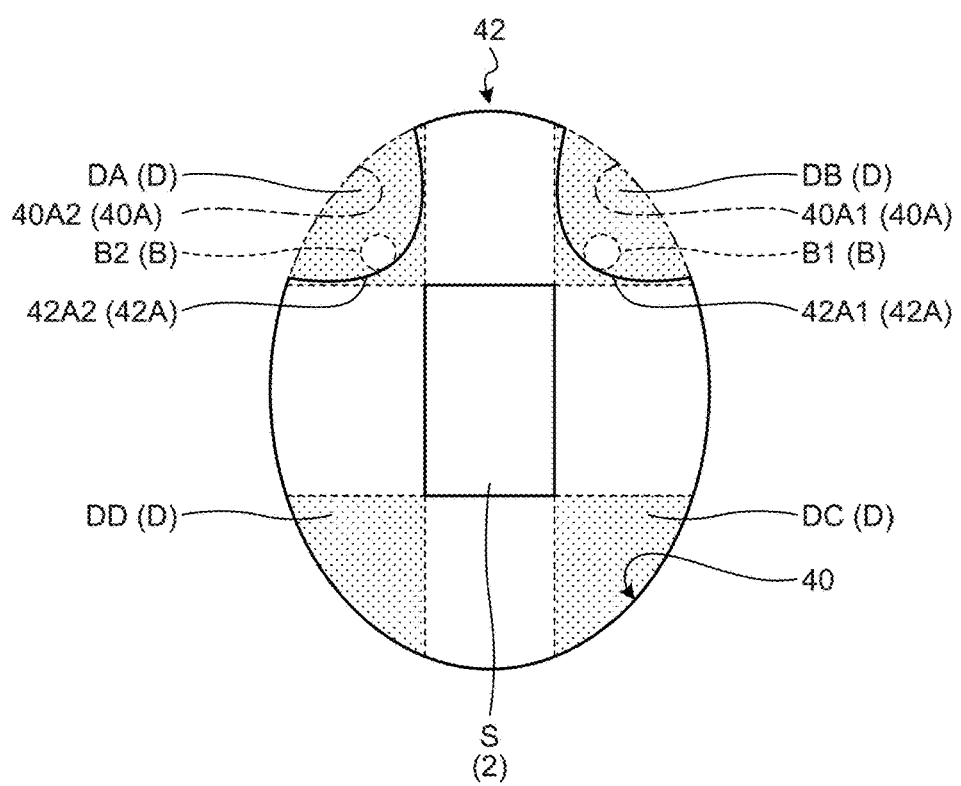
FIG. 6E is an explanatory diagram of the projection plane deformation process according to the embodiment.

In FIG. 6E, as an example, an object B2 and an object B1 are present within the overlap area DA and the overlap area DB, respectively, included in the overlap areas D (overlap area DA to overlap area DD) around the moving body 2. Each of the object B1 and the object B2 is an example of the object B. FIG. 6E is a schematic diagram of a plan view of the adjusted projection plane 42 as viewed from the vertical direction.

In the above case, the adjuster 26 deforms a component plane 40A1 that forms the overlap area DB including the object B1 on the reference projection plane 40 into a shape that passes the side of the reference position S of the moving body 2 with respect to the object B1, thereby providing an adjusted component plane 42A1. Likewise, the adjuster 26 deforms a component plane 40A2 that forms the overlap area DA including the object B2 on the reference projection plane 40 into a shape that passes the side of the reference position S of the moving body 2 with respect to the object B2, thereby providing an adjusted component plane 42A2. Each of the component plane 40A1 and the component plane 40A2 is an example of the component plane 40A of the reference projection plane 40. Each of the adjusted component plane 42A1 and the adjusted component plane 42A2 is an example of the adjusted component plane 42A.

In the above way, the adjuster 26 performs the projection plane deformation process by which the component plane 40A that forms the overlap area D including the object B on the reference projection plane 40 is deformed.

The deformation of the component plane 40A may be performed by changing the position coordinates of the component plane 40A in the virtual space. For example, the adjuster 26 may adjust component plane 40A of the reference projection plane 40 so as to provide the adjusted component plane 42A by performing a method that will be described below.

Figure 7A:
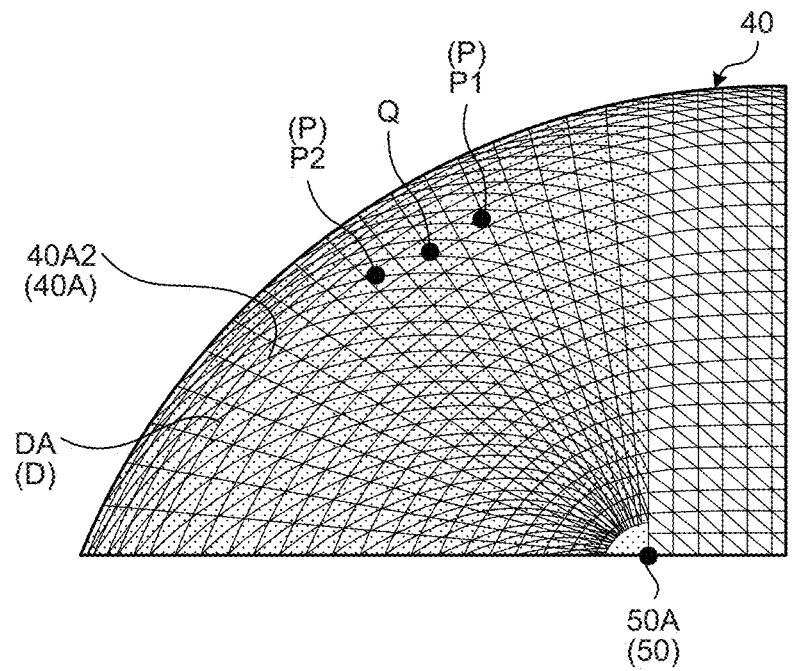
FIG. 7A is an explanatory diagram of the projection plane deformation process performed on a component plane according to the embodiment.
Figure 7B:
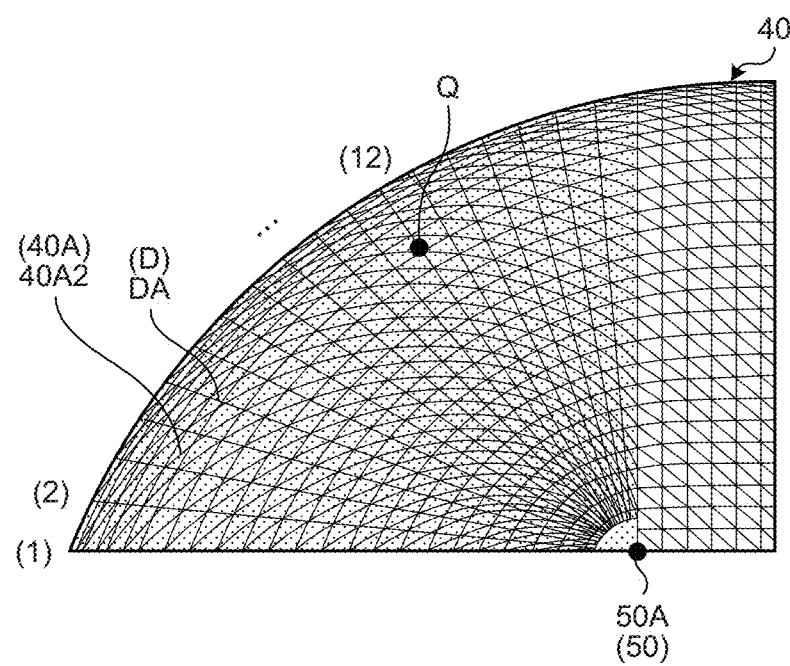
FIG. 7B is an explanatory diagram of the projection plane deformation process performed on the component plane according to the embodiment.
Figure 7C:
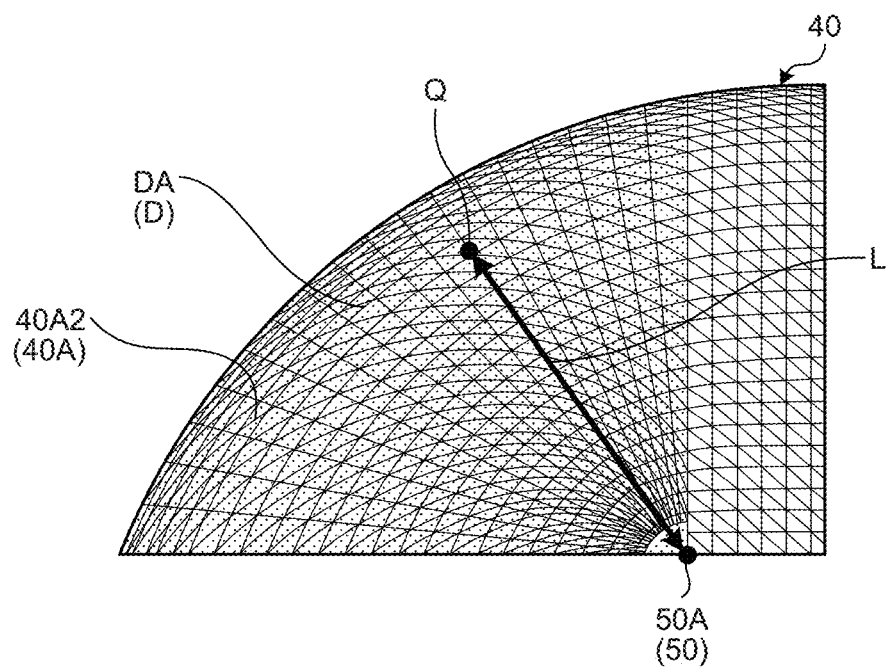
FIG. 7C is an explanatory diagram of the projection plane deformation process performed on the component plane according to the embodiment.

FIGS. 7A to 7C are explanatory diagrams of an example of the deformation process on the component plane 40A. Each of FIGS. 7A to 7C is a schematic diagram of a plan view of the reference projection plane 40 as viewed from the vertical direction.

In the virtual space, as illustrated in FIGS. 7A to 7C, the component plane 40A of the reference projection plane 40 includes segmented regions that are separated from one another by segmenting lines extending radially from a reference point 50.

The reference point 50 refers to a reference point on position coordinates set on the reference projection plane 40. In the present embodiment, as illustrated in FIG. 1, a point located closest to the moving body 2 (reference position S) in each of the overlap areas D is defined as the reference point 50 (reference point 50A to reference point 50D). The reference point 50A corresponds to a reference point 50 used as a reference at the position coordinates in the overlap area DA between the image capturing area E1 and the image capturing area E4. The reference point 50B corresponds to a reference point 50 used as a reference at the position coordinates in the overlap area DB between the image capturing area E1 and the image capturing area E2. The reference point 50C corresponds to a reference point 50 used as a reference at the position coordinates in the overlap area DC between the image capturing area E2 and the image capturing area E3. The reference point 50D corresponds to a reference point 50 used as a reference at the position coordinates in the overlap area DD between the image capturing area E3 and the image capturing area E4.

As illustrated in FIG. 7A, the adjuster 26 identifies intersections Q between straight lines that connect detection points P constituting the object B included in the overlap area DA and segmenting lines between the segmented regions constituting the component plane 40A2 of the reference projection plane 40. In FIG. 7A, a detection point P1 and a detection point P2 are depicted as an example of the detection points P constituting the object B. The detection point P1 and the detection point P2 are top two detection points P closest to the reference position S out of the detection points P constituting the object B. In a case where multiple intersections Q are acquired, any one of the intersections Q may be selected. For example, an intersection which is located closest to the reference point 50 may be selected.

Following the above, as illustrated in FIG. 7B, the adjuster 26 searches for an index of the identified intersection Q. The index refers to information for use in identifying a position on the reference projection plane 40. The reference projection plane 40 is given in advance an index for each of segmented regions formed by separating the reference projection plane 40 into plural regions. In FIG. 7B, numerical values in the parentheses are depicted as examples of indices. For example, the adjuster 26 may search for an index "12" as the index of the intersection Q.

Following the above, as illustrated in FIG. 7C, the adjuster 26 calculates a distance L from the reference point 50 to the intersection Q at the position specified by the above index.

In the form illustrated in FIG. 7C, the adjuster 26 calculates the distance L from the reference point 50A to the intersection Q. In this case, the distance L may be a distance in a horizontal direction, which is parallel to the bottom 400A. The adjuster 26 changes, by using the distance L, the position coordinates of the component plane 40A2 in the overlap area DA in the virtual space in such a way that a shape of the component plane 40A2 becomes a shape passing the intersection Q or passing between the intersection Q and the reference point 50A. More specifically, the adjuster 26 changes position coordinates of a region on the component plane 40A2 that forms the overlap area DA, the region being apart in the horizontal direction from the reference point 50A by the distance L or longer, in such a way that the distance in the horizontal direction from the reference point 50A becomes equal to or less than the distance L. In other words, the adjuster 26 deforms the component plane 40A2 in the overlap area DA in such a way that the component plane 40A2 becomes a plane that passes the position of the object B or a position closer to the reference position S than the object B.

Consequently, as illustrated in FIGS. 6B to 6E, the component plane 40A that forms the overlap area D including the object B on the reference projection plane 40 has a shape to pass on the side of the reference position S of the moving body 2 with respect to the object B, thereby providing the adjusted component plane 42A. As a result, the component plane 40A in the overlap area D on the reference projection plane 40 is deformed into the adjusted component plane 42A, so that the reference projection plane 40 is changed into the adjusted projection plane 42.

The adjuster 26 preferably adjusts the cross section of the adjusted projection plane 42 so as to have an N-th-ordercurved shape that passes the side of the reference position S with respect to the object B. In this case, N is an integer of two or more.

As illustrated in FIGS. 6B to 6E, the adjuster 26 deforms the component plane 40A that forms the overlap area D including the object B into a shape that passes the side of the reference position S with respect to the object B; however, the adjuster 26 does not necessarily have to deform component planes that form regions on the reference projection plane 40 other than the component plane 40A that forms the overlap area D.

Alternatively, the adjuster 26 may deform the component plane 40A that forms the overlap area D including the object B into a shape that passes the side of the reference position S with respect to the object B and may deform component planes in regions on the reference projection plane 40 other than the component plane 40A that forms the overlap area D, in accordance with the shape of the adjusted component plane 42A, which has been obtained by deforming the component plane 40A.

Figure 8A:
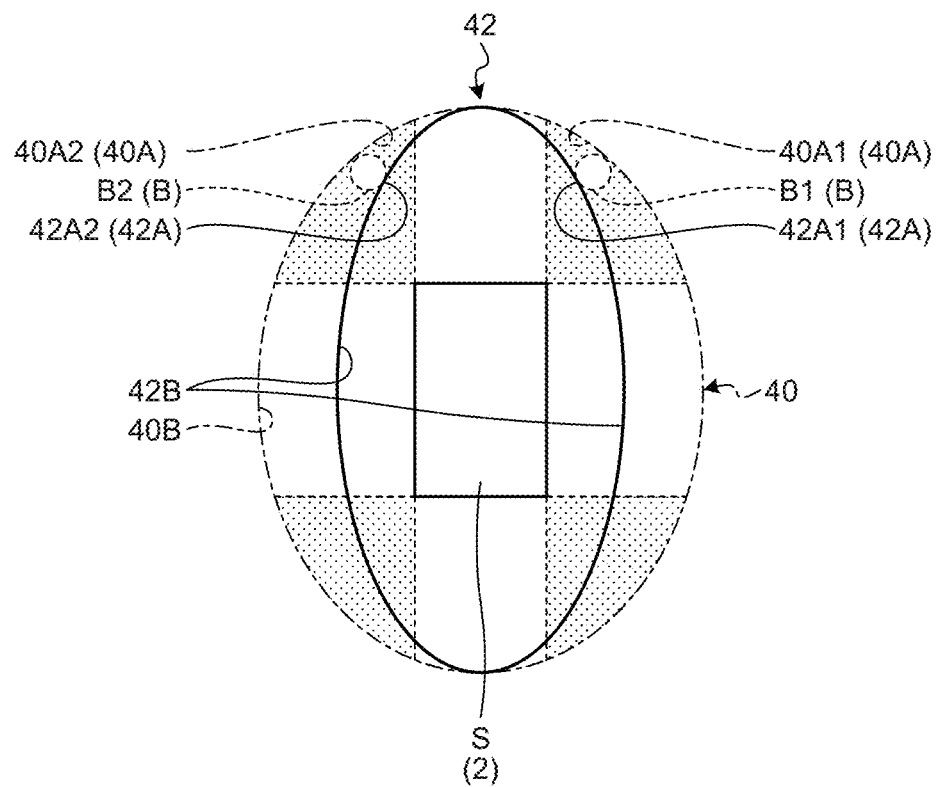
FIG. 8A is an explanatory diagram of an adjusted projection plane according to the embodiment.
Figure 8B:
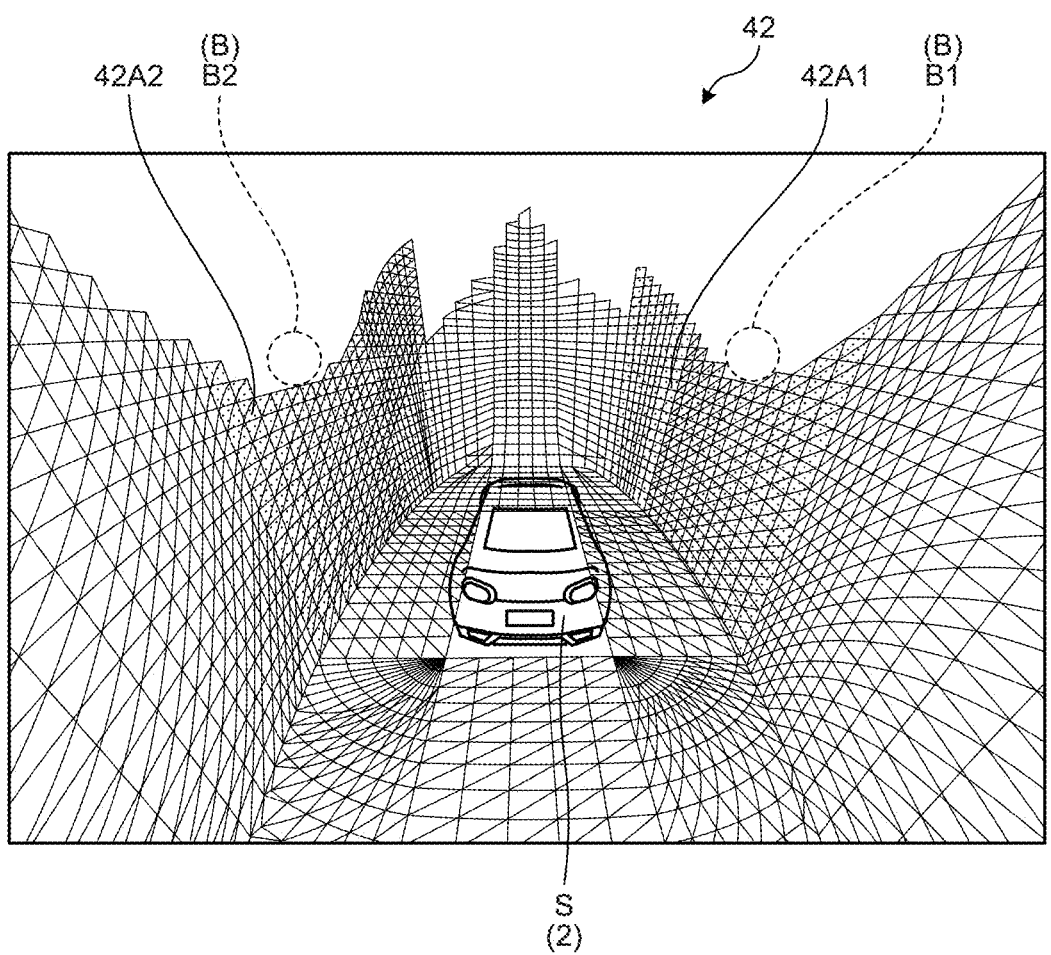
FIG. 8B is a schematic diagram of the adjusted projection plane according to the embodiment.

FIGS. 8A and 8B are schematic diagrams of an example of the adjusted projection plane 42. FIG. 8A is a schematic diagram of a plan view of the adjusted projection plane 42 as viewed from the vertical direction. FIG. 8B is a diagram of the adjusted projection plane 42 as viewed from a direction (the arrow W direction in FIG. 4) inclined in the vertical direction.

For example, it is now assumed that the overlap area DA includes the object B2 and the overlap area DB includes the object B1. In this case, the adjuster 26 deforms a shape of a component plane 40A1 in the overlap area DB including the object B1 on the reference projection plane 40 into a shape that passes the side of the reference position S of the moving body 2 with respect to the object B1, thereby providing an adjusted component plane 42A1. Likewise, the adjuster 26 deforms a shape of the component plane 40A2 that forms the overlap area DA including the object B2 on the reference projection plane 40 into a shape that passes the side of the reference position S of the moving body 2 with respect to the object B2, thereby providing the adjusted component plane 42A2.

Following the above, the adjuster 26 generates an adjusted component plane 42B by deforming a shape of a component plane 40B, which is other than the component plane 40A1 and the component plane 40A2 on the reference projection plane 40, into a shape according to the adjusted component plane 42A1 and the adjusted component plane 42A2. More specifically, the adjuster 26 deforms a shape of the component plane 40B by causing the shape has a curved line whose curvature varies at rates within a range of a given value or less with respect to each curvature of the adjusted component plane 42A1 and the adjusted component plane 42A2. In this case, the adjusted projection plane 42 becomes a projection plane obtained by adjusting the entire shape of the reference projection plane 40 in accordance with the objects B included in the overlap areas D.

In the above way, the adjuster 26 may also generate the adjusted projection plane 42 by adjusting the entire shape of the reference projection plane 40, depending on the objects B included in the overlap areas D.

The vertical cross-section of each adjusted component plane 42A that forms the adjusted projection plane 42 is not limited to a specific shape. The vertical cross section refers to a cross section cut in the vertical direction of the bottom 400A. For example, the shape of the vertical cross section of the adjusted component plane 42A may be any of a straight line that passes the side of the reference position S with respect to the object B included in the overlap area D and that is parallel to the vertical direction, a straight line inclined in the vertical direction, a quadratic curve, and a square root curve.

FIGS. 9A to 9D are schematic diagrams of examples of a vertical cross-sectional shape of the adjusted projection plane 42.

Figure 9A:
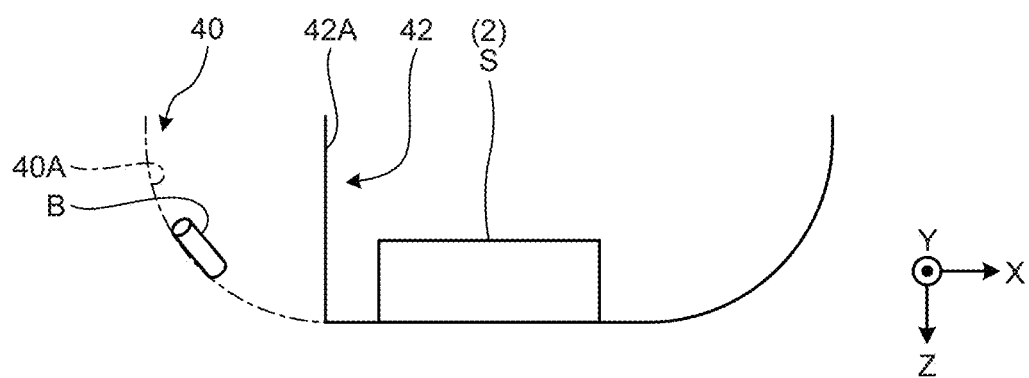
FIG. 9A is a schematic diagram of a cross-sectional shape of the adjusted projection plane according to the embodiment.

As illustrated in FIG. 9A, for example, the adjuster 26 may adjust the shape of the vertical cross section of the component plane 40A in the overlap area D including the object B on the adjusted projection plane 42 so as to become a linear shape parallel to the vertical direction (direction of arrow Z). In this case, the cross-sectional shape of the adjusted component plane 42A in the vertical direction is a linear shape extending in the vertical direction.

Figure 9B:
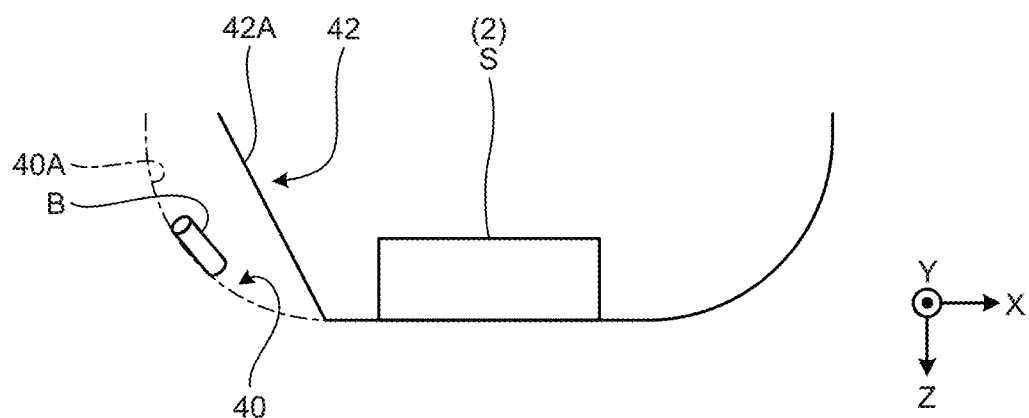
FIG. 9B is a schematic diagram of a cross-sectional shape of the adjusted projection plane according to the embodiment.

As illustrated in FIG. 9B, for example, the adjuster 26 may adjust the shape of the vertical cross section of the component plane 40A in the overlap area D including the object B on the adjusted projection plane 42 so as to become a linear shape inclined in the vertical direction (direction of arrow Z). In this case, the shape of the vertical cross section of the adjusted component plane 42A is a linear shape inclined in the vertical direction.

Figure 9C:
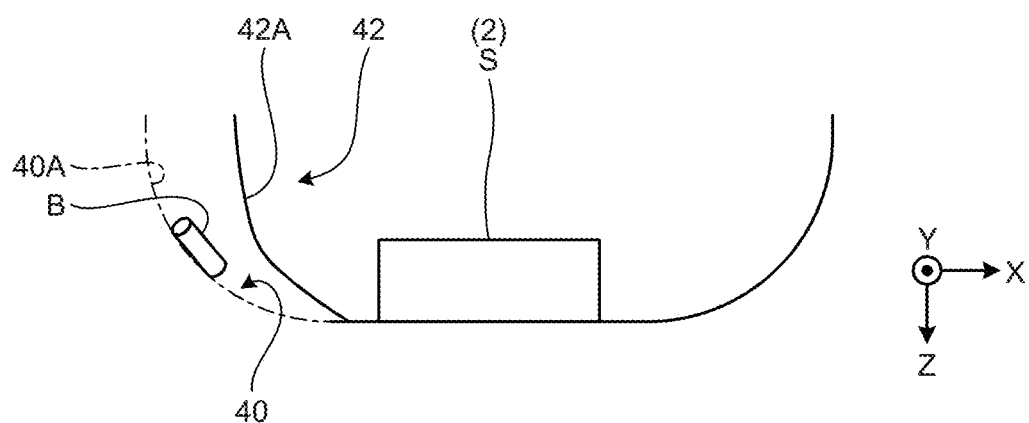
FIG. 9C is a schematic diagram of a cross-sectional shape of the adjusted projection plane according to the embodiment.

As illustrated in FIG. 9C, for example, the adjuster 26 may adjust the shape of the vertical cross section of the component plane 40A in the overlap area D including the object B on the adjusted projection plane 42 so as to become a quadratic curve shape. In this case, the shape of the vertical cross section of the adjusted component plane 42A is a quadratic curve.

Figure 9D:
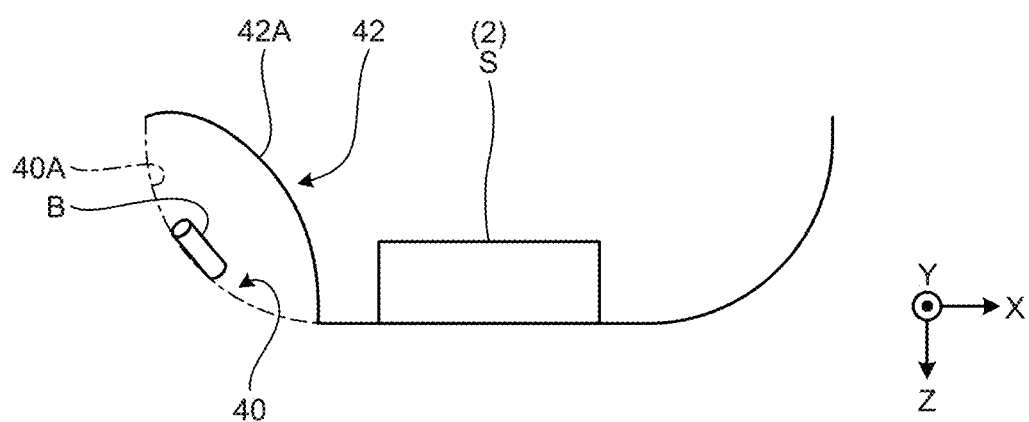
FIG. 9D is a schematic diagram of a cross-sectional shape of the adjusted projection plane according to the embodiment.

As illustrated in FIG. 9D, for example, the adjuster 26 may adjust the shape of the vertical cross section of the component plane 40A in the overlap area D including the object B on the adjusted projection plane 42 so as to become a square root curve shape. In this case, the shape of the vertical cross section of the adjusted component plane 42A is a square root curve shape.

In the above way, the adjuster 26 performs the deformation process by which the shape of the component plane 40A in the overlap area D including the object B is adjusted so as to become any of a straight line that passes the side of the reference position S with respect to the object B and that is parallel to the vertical direction, a straight line inclined in the vertical direction, a quadratic curve, and a square root curve.

Next, the image composite adjustment process, which is another example of the adjustment process performed by the adjuster 26, will be described.

The image composite adjustment process refers to an adjustment process by which the position and range of the image composite region F defined in the overlap area D including the object B on the reference projection plane 40 is adjusted in such a way that the image composite region F does not overlap with the object B. In other words, the image composite adjustment process refers to a process of, when parts of the captured images of the adjacent image capturing areas E are composited and projected onto the projection plane, changing the position and range of the overlap area D onto which the composited captured image is projected.

Figure 10A:
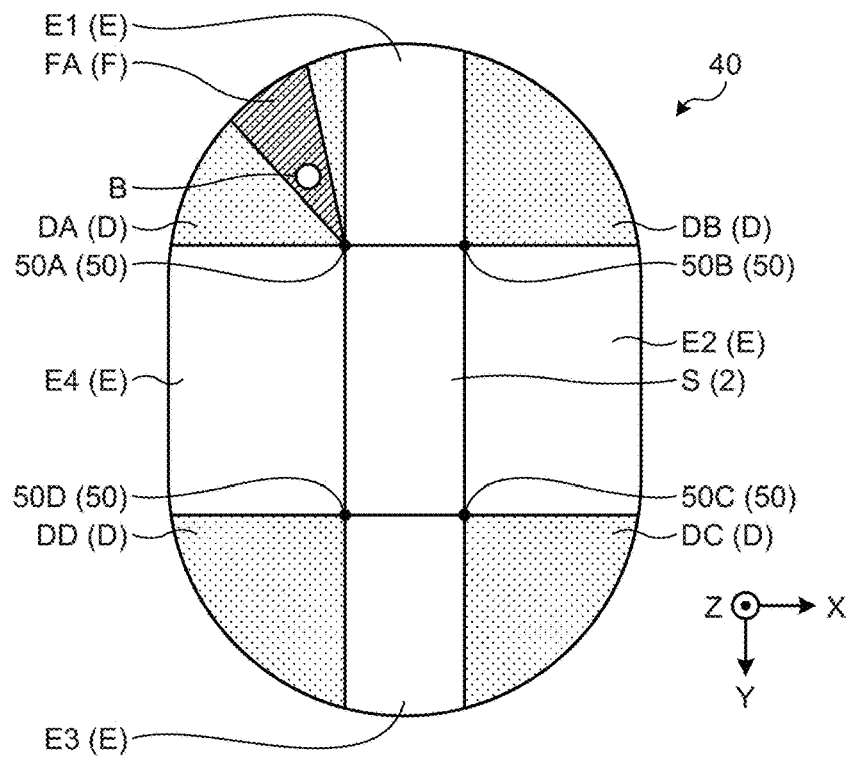
FIG. 10A is an explanatory diagram of an overlap area adjustment process according to the embodiment.
Figure 10B:
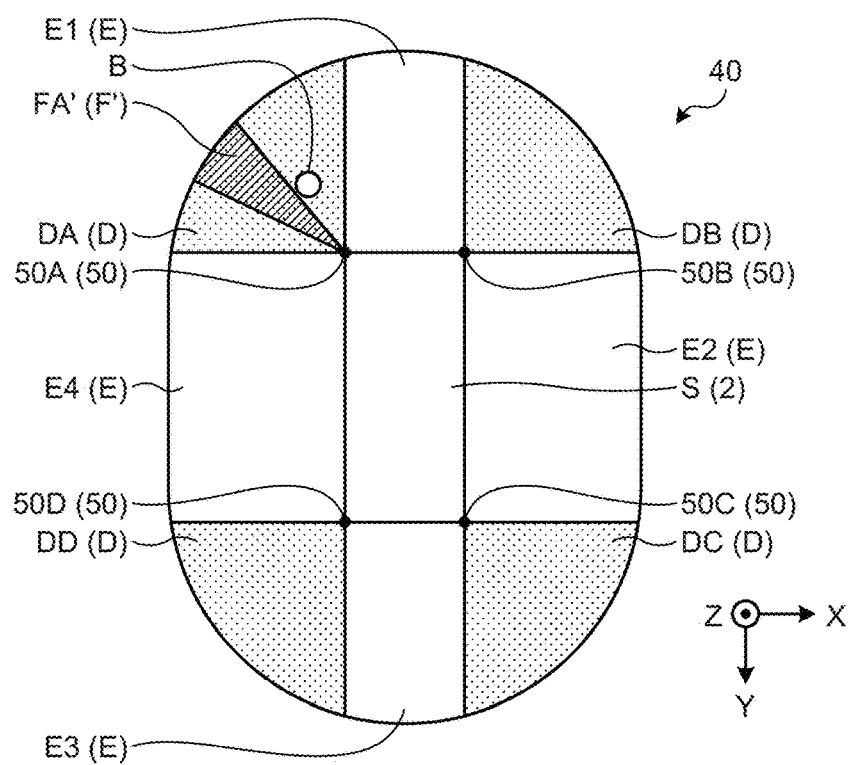
FIG. 10B is an explanatory diagram of the overlap area adjustment process according to the embodiment.

FIGS. 10A and 10B are explanatory diagrams of an example of the image composite adjustment process. FIG. 10A is a schematic diagram of a plan view of the reference projection plane 40 as viewed from the vertical direction. FIG. 10A illustrates the position and range of an image composite region F in an overlap area D indicated by the overlap area information 24B. As described above, the overlap area information 24B refers to information indicating the position and range of an image composite region F defined in each overlap area D on the reference projection plane 40.

FIG. 10A illustrates, as an example, a case where the object B is included in an image composite region FA, which is the image composite region F defined in the overlap area D between the image capturing area E1 and the image capturing area E4. In this case, as illustrated in FIG. 10B, the adjuster 26 adjusts the image composite region FA so as to become an image composite region FA', which is a range where the object B is not included. The adjuster 26 then generates information indicating the position and range of the adjusted image composite region FA'.

The information indicating the position and range of the adjusted image composite region FA' may be information indicating, for example, a composite coefficient for use in compositing the captured images of the adjacent image capturing areas E and to project the composite image onto the projection plane. The composite coefficient refers to information representing a ratio between two captured images to be blended together. For example, the composite coefficient may be a transparency value. The transparency value is sometimes referred to as alpha ($\alpha$) value. In the present embodiment, a case of the composite coefficient being the alpha value will be described.

In the above case, the image composite region F in the projected image is defined by adjusting the blending ratio between captured images for adjacent image capturing areas E. More specifically, the image composite region F is implemented by setting a composite coefficient of a partial area in a captured image within a range from more than 0 and less than 1.

A case where the composite coefficient is "0" means that captured images for two image capturing areas E constituting an overlap area D are not composited together and only one of the captured images for the two image capturing areas E is projected. A case where the composite coefficient is "1" means that captured images for two image capturing areas E constituting an overlap area D are not composited together and only the other one of the captured images for the two image capturing areas E is projected. A region in which the composite coefficient is more than 0 and less than 1 means that the captured images for the two image capturing areas E constituting the overlap area D are composited together and the resulting composite image is projected.

Figure 11B:
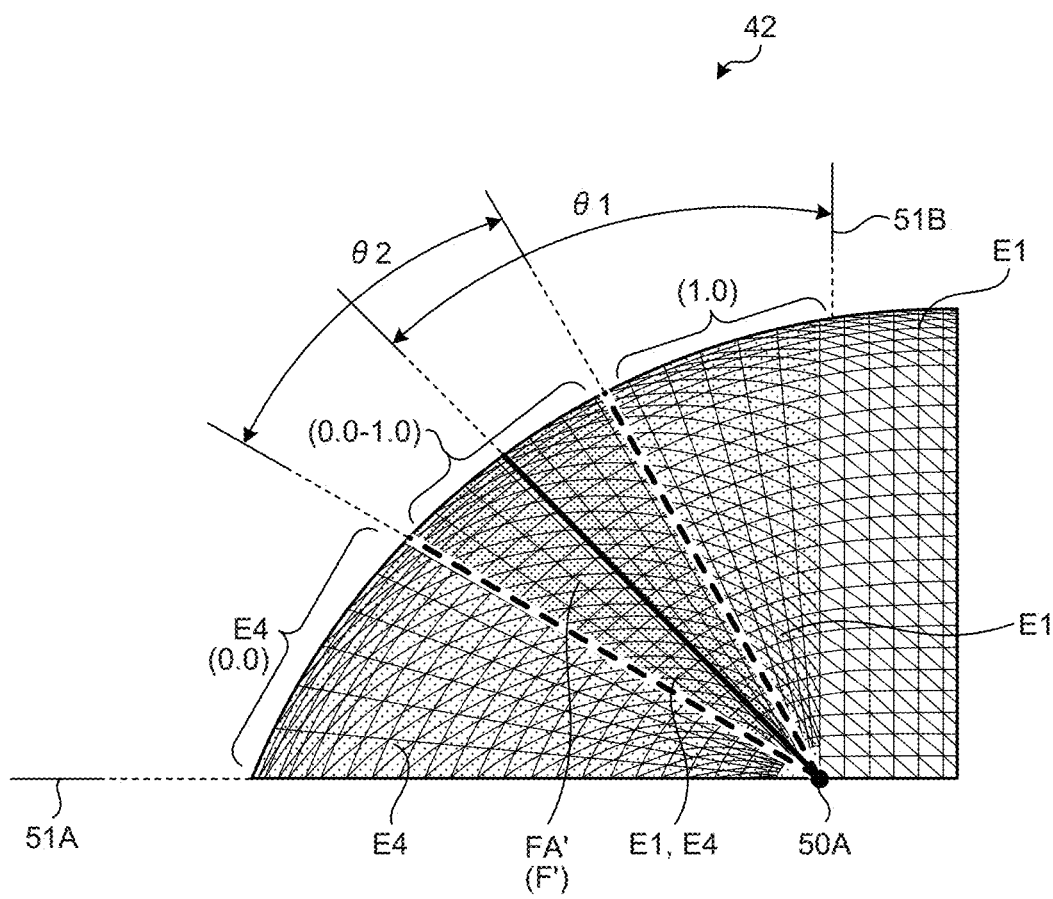
FIG. 11B is an explanatory diagram of the adjustment of the composite coefficients according to the embodiment.

FIGS. 11A and 11B are explanatory diagrams of an example of adjustment of composite coefficients.

As illustrated in FIG. 11A, for example, the reference projection plane 40 may be given in advance an index for each of segmented regions obtained by segmenting the reference projection plane 40 into plural regions. FIG. 11A illustrates, as an example, indices according to angles from a reference line 51 passing through the reference point 50. The reference line 51 is a straight line that connects both sides of the rear portion of the moving body 2, a straight line that connects both sides of the front portion, a straight line that extends along the entire length direction of the moving body 2, and a straight line that passes through the reference point 50. In FIGS. 11A and 11B, a reference line 51A and a reference line 51B, each passing through the reference point 50A, are depicted as examples of the reference line 51.

A composite coefficient is preset for each index on the reference projection plane 40. Thus, the overlap area information 24B includes, as information indicating the position and range of the image composite region F, an index to which a composite coefficient within a range from more than 0 to less than 1 is given and a value of a composite coefficient set to individual indices.

For example, a case where the adjuster 26 adjusts the image composite region FA so as to become an image composite region FA' will be described. In this case, the adjuster 26 calculates angles of the image composite region FA'. For example, the adjuster 26 calculates an angle $\theta 1$ and an angle $\theta 2$ illustrated in FIG. 11A, as the angles of the image composite region FA'. The angle $\theta 2$ is an angle for use in defining the range of the image composite region FA'. Each angle of the image composite region FA' is information that indicates a range covering the image composite region FA' by using an angle whose vertex is the reference point 50A. The angle $\theta 1$ is an angle between the reference line 51B and the overlap area DA', and is an angle for setting the position of the image composite region FA'.

Following the above, the adjuster 26 searches for an index corresponding to the angle $\theta 1$ and the angle $\theta 2$ of the image composite region FA' on the reference projection plane 40. For example, the adjuster 26 may search for the indices "7" to "13" as indices corresponding to the angle $\theta 1$ and the angle $\theta 2$ of the image composite region FA'. The adjuster 26 sets each of the found indices "7" to "13" to the composite coefficient of more than 0 and less than 1. The adjuster 26 then gives, to an index of the overlap area DA other than the image composite region FA', a composite coefficient for use in projecting only the captured image for the image capturing area E positioned adjacent to the area of the index. For example, the adjuster 26 may set each of the index "1" to the index "6" to "0", which is a composite coefficient indicating that only the captured image for the image capturing area E4 is to be projected. Likewise, the adjuster 26 sets each of the index "14" to the index "18" to "1", which is a composite coefficient indicating that only the captured image for the image capturing area E1 is to be projected. The adjuster 26 then gives a composite coefficient linearly increasing from 0 to 1 to the indices "7" to "13" of the image composite regions FA'.

As a result of the above, as illustrated in FIG. 11B, the composite coefficient of more than 0 to less than 1 is given to the indices for the angle $\theta 2$ of the adjusted image composite region FA'. Moreover, a composite coefficient "0.0" is given to indices for a region that is other than the image composite region FA' in the overlap area DA and that is continued to the image capturing area E4. Likewise, a composite coefficient "1.0" is given to indices for a region that is other than the image composite region FA' in the overlap area DA and that is continued to the image capturing area E1.

Following the above, the adjuster 26 outputs, to the generator 28, composite coefficient information indicating the adjusted composite coefficients that have been given to the respective indices, as information indicating the position and range of the adjusted image composite region FA'.

The adjuster 26 may perform, as the adjustment process, at least one of the projection plane deformation process by which the component plane 40A of the reference projection plane 40 is deformed and the image composite adjustment process by which the position and range of the image composite region F defined in the overlap area D are adjusted. The adjuster 26 may perform the projection plane deformation process and the image composite adjustment process in combination.

Returning to FIG. 3, the description will be continued. The adjuster 26 outputs, to the generator 28, at least one of the adjusted projection plane information on the adjusted projection plane 42, which is obtained by adjusting the reference projection plane 40, and the composite coefficient information. In the present embodiment, a mode in which the adjuster 26 outputs both of the adjusted projection plane information and the composite coefficient information to the generator 28 will be described as an example.

The generator 28 receives at least one of the adjusted projection plane information and the composite coefficient information from the adjuster 26. Based on the received information, the generator 28 projects the captured images, which have been acquired by acquisition unit 20, onto the adjusted projection plane 42, thereby generating the projected image.

Figure 12:
FIG. 12 is a schematic diagram of a projected image according to the embodiment.

FIG. 12 is a schematic diagram of an example of a projected image 60. FIG. 12 illustrates a projected image 60A as an example of the projected image 60. The generator 28 projects the captured images that have been acquired by acquisition unit 20 onto the adjusted projection plane 42, which has the shape indicated by the adjusted projection plane information received from the adjuster 26. The adjusted projection plane 42 is a projection plane whose component plane 40A of the overlap area D including the object B has been deformed through the adjustment process.

Consequently, the projected image 60A becomes an image in which the image of the object B included in the overlap area D is suppressed from blurring and being absent.

Figure 13A:
FIG. 13A is a schematic diagram of a comparative projected image according to a conventional technique.
Figure 13B:
FIG. 13B is a schematic diagram of the comparative projected image according to the conventional technique.

FIGS. 13A and 13B are schematic diagrams of an example of a comparative projected image 600 in the conventional technique. Each of FIGS. 13A and 13B is an example in which captured images used to generate the projected image 60A illustrated in FIG. 12 are projected onto the reference projection plane 40.

In some cases, as illustrated in FIG. 13A, the conventional technique provides a comparative projected image 600A in which the image of the object B present within the overlap area D blurs. In some other cases, as illustrated in FIG. 13B, the conventional technique provides a comparative projected image 600B in which the object B present within the overlap area D is absent.

On the other hand, in the present embodiment, the generator 28 generates the projected image 60 by projecting captured images onto the adjusted projection plane 42. Therefore, as illustrated in FIG. 12, the generator 28 can generate the projected image 60 in which the image of the object B present within the overlap area D is suppressed from blurring or being absent.

In a case where the composite coefficient information is received, the generator 28 may change the transparency values of the captured images for the image capturing areas E in accordance with the composite coefficients given to the respective indices indicated by the composite coefficient information, and then may project those captured images onto the adjusted projection plane 42.

Figure 14:
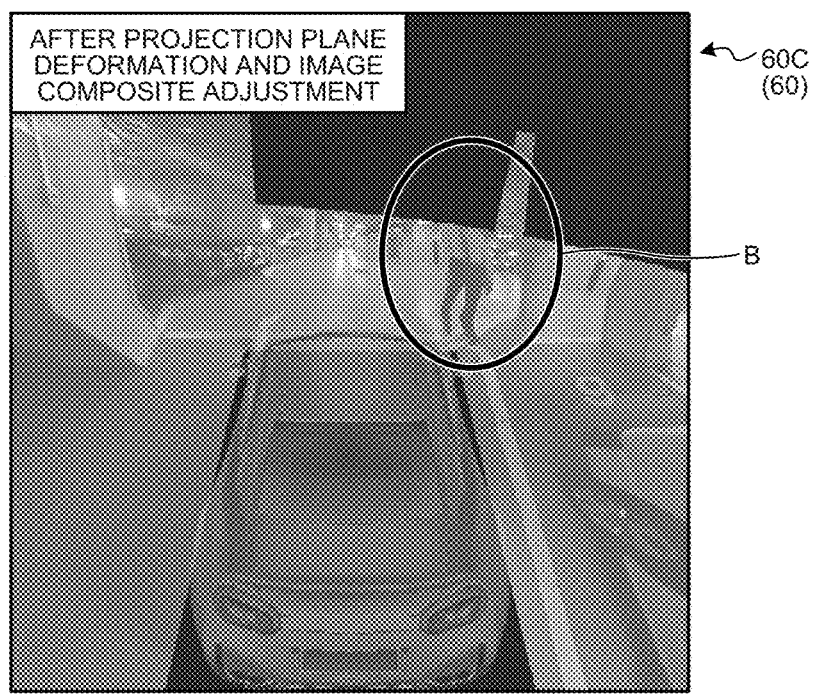
FIG. 14 is a schematic diagram of a projected image according to the embodiment.

FIG. 14 is a schematic diagram of an example of the projected image 60. FIG. 14 illustrates a projected image 60C as an example of the projected image 60. The projected image 60C is an example of the projected image 60, which is obtained by projecting the captured images whose transparency value has been adjusted in accordance with the total coefficient of the composite coefficient information, onto the adjusted projection plane 42 whose shape is indicated by the adjusted projection plane information. In short, the projected image 60C is an example of the projected image 60 that is generated by performing the projection plane deformation process and the image composite adjustment process as the adjustment process. Also, the projected image 60C is an example of the projected image 60 in which the shape of the reference projection plane 40 is changed and the position and range of the image composite region F are adjusted so as not to overlap with the object B.

Consequently, the projected image 60C becomes an image in which the image of the object B included in the overlap area D is suppressed from blurring and being absent.

Figure 15A:
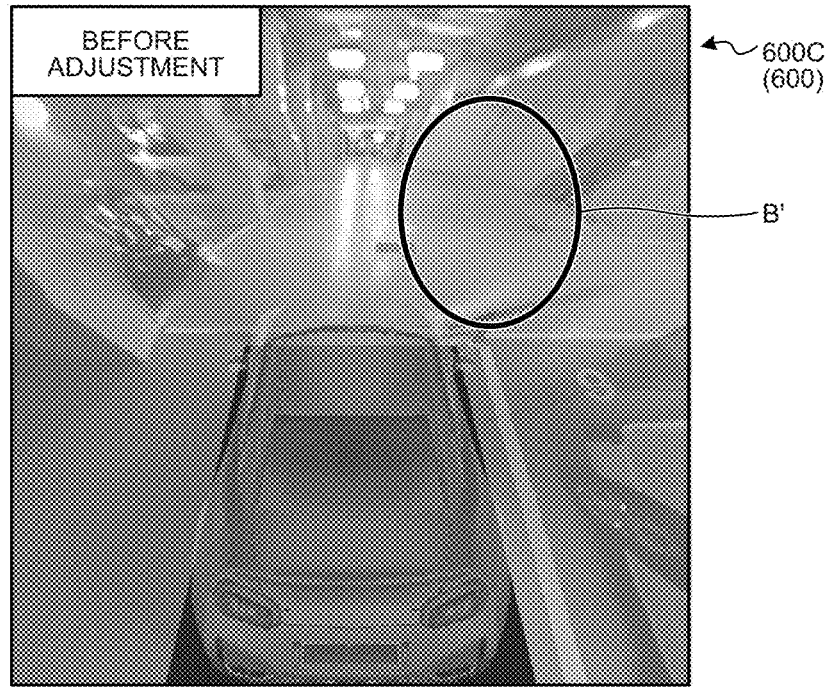
FIG. 15A is a schematic diagram of a comparative projected image in a conventional technique.
Figure 15B:
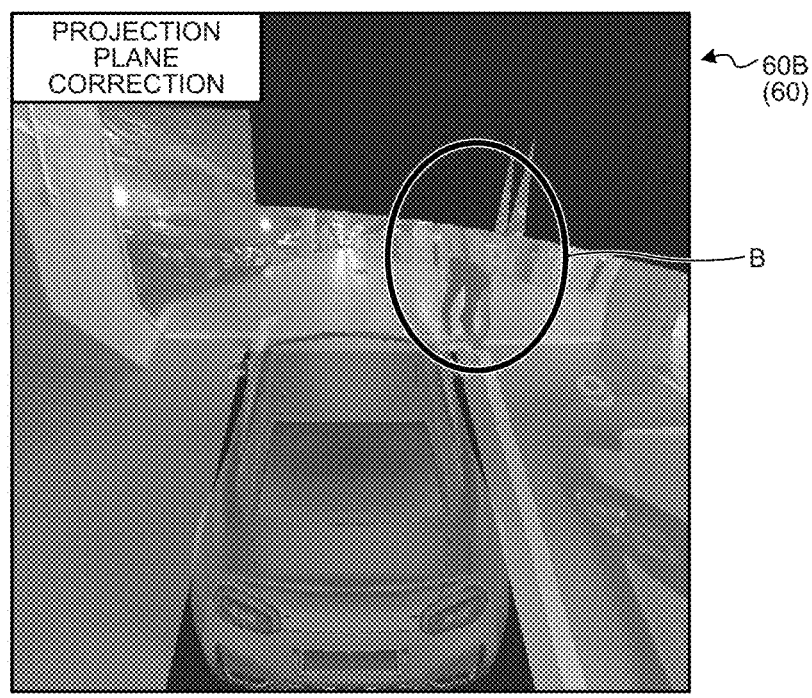
FIG. 15B is a schematic diagram of a projected image according to the embodiment.

FIG. 15A is a schematic diagram of an example of the comparative projected image 600 in the conventional technique. FIG. 15A is an example in which the captured images used to generate the projected image 60C illustrated in FIG. 14 are projected onto the reference projection plane 40. FIG. 15B is a schematic diagram of an example of a projected image 60B, which is obtained by projecting the captured images used to generate the projected image 60C illustrated in FIG. 14 onto the adjusted projection plane 42. In short, the projected image 60B illustrated in FIG. 15B is an example of the projected image 60 generated by performing the deformation process as the adjustment process.

As illustrated in FIG. 15A, the conventional technique may provide a comparative projected image 600C in which the object B present within the overlap area D is absent. In contrast, a case where the deformation process is performed on the reference projection plane 40 as the adjustment process will be described. In this case, as illustrated in FIG. 15B, the projected image 60B becomes a projected image in which at least one of blurring and absence (object B is absent in case of FIG. 15B) of the image of the object B included in the overlap area D is suppressed, in comparison with the comparative projected image 600C. Another case where the deformation process and the overlap area adjustment process are performed as the adjustment process will be described. In this case, as illustrated in FIG. 14, the projected image 60C becomes a projected image in which the other (image of the object B blurs in case of FIG. 14) of the blurring and absence of the image of the object B included in the overlap area D is further suppressed, as opposed to the projected image 60B illustrated in FIG. 15B.

For the above reason, the adjuster 26 preferably performs both of the deformation process and the overlap area adjustment process as the adjustment process.

Returning to FIG. 3, the description will be continued. The display controller 30 performs control in such a way that the display unit 16 displays the projected image 60 generated by the generator 28. Thus, the display unit 16 displays the projected image 60 in which at least one of blurring and absence of the image of the object B present in the real space is suppressed. The display controller 30 may perform display control in such a way that the display unit 16 displays the projected image 60, after having subjected the projected image 60 to various image processes, for example, by which the projected image 60 is changed into an image viewed from a virtual viewpoint.

Next, a description will be given of an example of a flow of the image process performed by the image processing apparatus 10.

Figure 16:
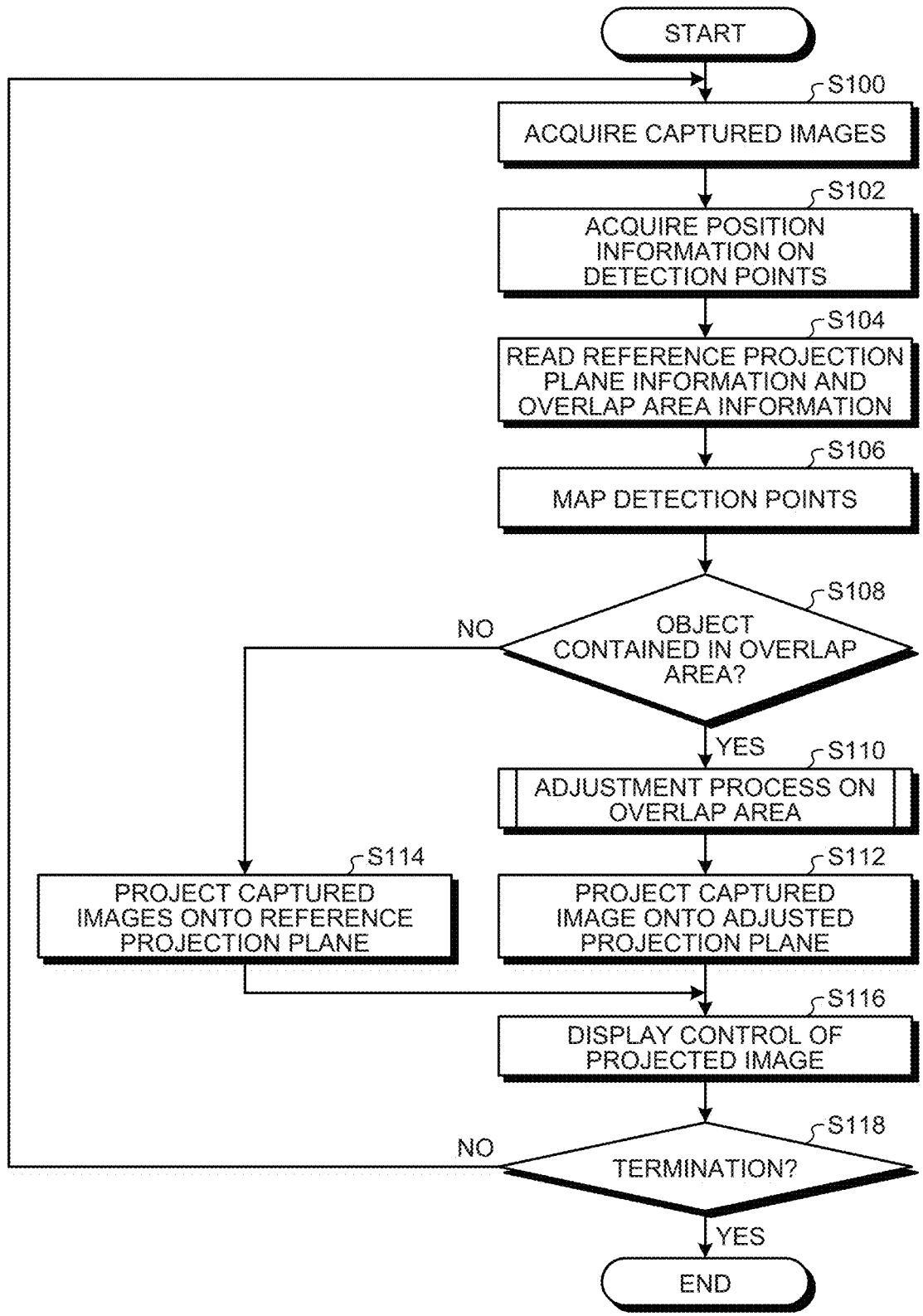
FIG. 16 is a flowchart of a flow of an image process according to the embodiment.

FIG. 16 is a flowchart of an example of the flow of the image process performed by the image processing apparatus 10 described above.

The acquisition unit 20 acquires multiple captured images from the image capturing units 12 (Step S100). In addition, the acquisition unit 20 acquires position information on the detection points P from the detectors 14 (Step S102).

The determination unit 22 reads the reference projection plane information 24A and the overlap area information 24B from the storage unit 24 (Step S104).

The determination unit 22 maps the detection points P defined by the position information that has been acquired in Step S102 on the reference projection plane 40 indicated by the reference projection plane information 24A that has been read at Step S104 (Step S106).

The determination unit 22 determines whether the object B is included in the overlap area D by using the overlap area information 24B that has been read at Step S104 and the mapping result of Step S106 (Step S108). When the determination unit 22 determines that the object B is included in the overlap area D (Yes in Step S108), the process proceeds to Step S110.

At Step S110, the adjuster 26 performs the adjustment process on the component plane 40A of the reference projection plane 40 (Step S110). The adjustment process at Step S110 refers to a process of adjusting the overlap area D including the object B on the reference projection plane 40. As described above, the adjuster 26 performs, as the adjustment process, at least one of the deformation process by which the component plane in the overlap area D on the reference projection plane 40 is deformed and the image composite adjustment process by which the position and range of the image composite region defined in the overlap area D on the reference projection plane 40 are adjusted. Details of the flow of the adjustment process will be described later.

As a result of the process at Step S110, the adjusted projection plane 42 is generated, and the adjusted projection plane information on the adjusted projection plane 42 that has been obtained by performing the deformation process on the component plane 40A of the reference projection plane 40 and the composite coefficient information that has been generated through the image composite adjustment process are generated.

Following the above, the generator 28 composites the captured images that have been acquired at Step S100 by using the composite coefficients indicated by the composite coefficient information that has been generated at Step S110. The generator 28 then projects a composite image onto adjusted projection plane 42 that has been generated at Step S110 (Step S112). As a result of the process at Step S112, the generator 28 generates the projected image 60. The process then proceeds to Step S116 described later.

When the determination unit 22 makes a negative determination at Step S108 (No in Step S108), the process proceeds to Step S114. At Step S114, the generator 28 projects the captured images that have been acquired at Step S100 onto the reference projection plane 40 (Step S114). The process then proceeds to Step S116.

At Step S116, the display controller 30 performs the display control in such a way that the display unit 16 displays the projected image 60 that has been generated at Step S112 or the projected image that has been generated at Step S114 (Step S116).

Following the above, the image processing apparatus 10 determines whether to terminate the image process (Step S118). For example, the image processing apparatus 10 may perform the process at Step S118 by determining whether the image processing apparatus 10 has received an entry of an instruction that indicates the termination of the image process. When the image processing apparatus 10 makes a negative determination at Step S118 (No in Step S118), the process returns to Step S100. When making an affirmative determination at Step S118 (Yes in Step S118), the image processing apparatus 10 terminates this routine. After the process has returned from Step S118 to Step S100, the image processing apparatus 10 may set a new reference projection plane 40 to the adjusted projection plane 42 that has been generated at Step S110 and may continue the process.

Next, a description will be given of an example of a flow of the deformation process, which corresponds to the adjustment process at Step S110.

Figure 17:
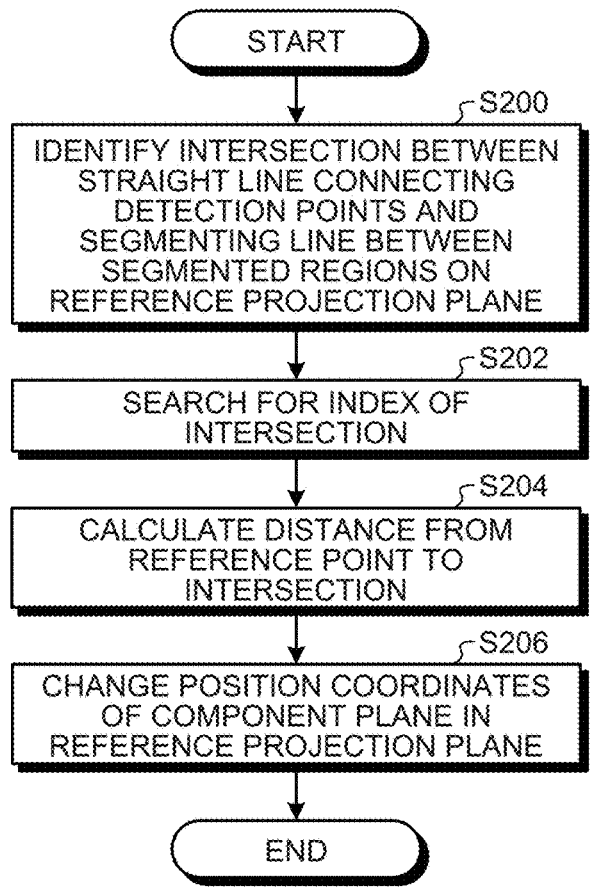
FIG. 17 is a flowchart of a flow of the projection plane deformation process according to the embodiment.

FIG. 17 is a flowchart of an example of a flow of the deformation process.

The adjuster 26 identifies, from the detection points in the position information that has been acquired at Step S102 (see FIG. 16), intersections Q between straight lines that connect the detection points P constituting the object B included in the overlap area D and segmenting lines between the segmented regions constituting the component plane 40A of the reference projection plane 40 (Step S200).

Following the above, the adjuster 26 searches for the indices of the intersections Q that have been identified at Step S200 (Step S202). The adjuster 26 then calculates the distances L from the reference points 50 to the intersections Q specified by the indices (Step S204). In this case, the distance L may be a distance in a horizontal direction, which is parallel to the bottom 400A.

The adjuster 26 changes the position coordinates of the component plane 40A so that the distance between the reference point 50 and the component plane 40A in the overlap area D including the object B on the reference projection plane 40 becomes equal to or less than the distance L (Step S206). As a result of the process at Step S206, the component plane 40A in the overlap area D including the object B on the reference projection plane 40 is deformed so as to become the adjusted component plane 42A. The adjusted projection plane 42 is thereby generated. The adjuster 26 then terminates this routine.

Next, an example of a flow of the image composite adjustment process, which corresponds to the adjustment processing at Step S110 will be described.

Figure 18:
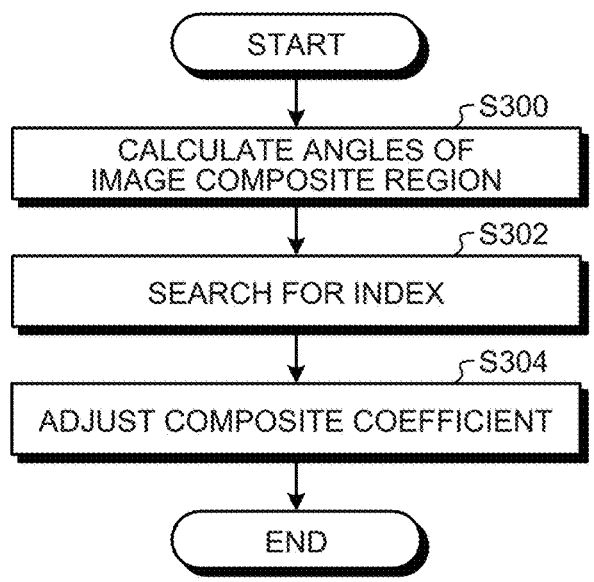
FIG. 18 is a flowchart of a flow of the overlap area adjustment process according to the embodiment.

FIG. 18 is a flowchart of an example of a flow of the image composite adjustment process.

The adjuster 26 adjusts the image composite region F defined in the overlap area D including the object B on the reference projection plane 40 so as to become the image composite region F having an angle at which the object B is not included. The adjuster 26 then calculates the angles (angle θ1 and angle θ2) of the image composite region F (Step S300).

Following the above, the adjuster 26 searches for indices related to the angles of the image composite region F that have been calculated at Step S300 (Step S302).

Following the above, the adjuster 26 adjusts the composite coefficients that have been set for the indices of the overlap area D in such a way that the region of the indices that have been found at Step S302 becomes the image composite region F (Step S304). As a result of the process at Step S304, composite coefficients of more than 0 and less than 1 are given to the indices of the adjusted image composite region F on the reference projection plane 40. In this state, the composite coefficient "0.0" or "1.0" is given to each region other than the adjusted image composite region F on the overlap area D. The adjuster 26 then outputs, to the generator 28, the composite coefficient information indicating the adjusted composite coefficients that have been given to the respective indices, as information indicating the position and range of the adjusted image composite region F'. The adjuster 26 then terminates this routine.

As described above, the image processing apparatus 10 in the present embodiment includes the acquisition unit 20, the determination unit 22, and the adjuster 26. The acquisition unit 20 acquires captured images with the respective image capturing areas E overlapping with one another. The determination unit 22 determines whether the object B is included in the overlap area D of adjacent captured images on the reference projection plane 40 having a predetermined shape, which is an image projection plane virtually disposed in a virtual space corresponding to the real space. The adjuster 26 performs the adjustment process on the overlap area D including the object B on the reference projection plane 40.

In the conventional technique, no image processes focused on the overlap area D have been performed. In the conventional technique, when the object B is present within the overlap area D of the captured images projected onto the projection plane, the object B may be absent or the image of the object B blurs within the area of the projected image onto which the object B is projected.

The image processing apparatus 10 in the present embodiment performs the adjustment process on the overlap area D including the object B on the reference projection plane 40.

The image processing apparatus 10 in the present embodiment therefore project the captured images on the adjusted projection plane 42, which is obtained by adjusting the reference projection plane 40 with the adjuster 26, thereby successfully suppressing the object B included within the overlap area D between the captured images from being absent or the image of the object B from blurring.

The embodiments have been described above; however, the image processing apparatus, the image processing method, and the image processing program disclosed in this application are not limited to those in the foregoing embodiments. At the implementation stage, it is possible to modify and embody components to the extent of not departing from the spirits of the embodiments. Moreover, it is possible to make various inventions by appropriately combining elements disclosed in the above embodiments. For example, some components may be deleted from all components described in the embodiments.

The image processing apparatus 10 in the foregoing embodiments is applicable to various apparatuses and systems. For example, the image processing apparatus 10 in the foregoing embodiment is applicable to monitoring camera systems that process video obtained from monitoring cameras or in-vehicle camera systems, such as in-vehicle surround view monitor systems, parking assistance systems, and automatic driving systems, that process images of surrounding environment outside vehicles.

According to one aspect of an image processing apparatus in the present disclosure, it is possible to, when an object is included in an overlap portion of captured images, suppress the object from being absent or the object image from blurring in a projected image.

What is claimed is:

1. An image processing apparatus comprising:
a hardware processor connected to a memory and configured to perform a process including:
acquiring a plurality of captured images whose capturing areas overlap with one another;
determining whether an object is included in an overlap portion of adjacent ones of the plurality of captured images in a projected image, the projected image being obtained by projecting the plurality of captured images onto a reference projection plane, the reference projection plane being an image projection plane virtually disposed in a virtual space corresponding to a real space; and
performing an adjustment process on an overlap area of the reference projection plane, the overlap area including the object on the reference projection plane and corresponding to the overlap portion including the object,
wherein the reference projection plane is the image projection plane which is virtually disposed in the virtual space and whose reference position is a central region of a bottom of the reference projection plane.

2. The image processing apparatus according to claim 1, the process further includes generating the projected image which is obtained by projecting the plurality of captured images onto an adjusted projection plane, the adjusted projection plane being the image projection plane on which the adjustment process has been performed.

3. The image processing apparatus according to claim 1, wherein the object is a three-dimensional object.

4. The image processing apparatus according to claim 1, wherein the reference projection plane has a predetermined shape.

5. The image processing apparatus according to claim 1, wherein the adjustment process is a projection plane deformation process of deforming a shape of the overlap area of the reference projection plane into a shape passing a side of the reference position with respect to the object.

6. The image processing apparatus according to claim 1, wherein the adjustment process is a projection plane deformation process of deforming a shape of a horizontal cross section of the overlap area of the reference projection plane into a shape passing a side of the reference position with respect to the object.

7. The image processing apparatus according to claim 1, wherein the adjustment process is a projection plane deformation process of deforming a shape of the overlap area of the reference projection plane into a shape passing at least one of detection points constituting the object, the one detection point being located closest to the reference position, or between the one detection point and the reference position.

8. The image processing apparatus according to claim 1, wherein the adjustment process is a projection plane deformation process of deforming a shape of the overlap area of the reference projection plane into a shape passing a side of the reference position with respect to the object, without deforming a shape of an area other than the overlap area of the reference projection plane.

9. The image processing apparatus according to claim 1, wherein the adjustment process is a projection plane deformation process of:
deforming a shape of the overlap area of the reference projection plane into a shape passing a side of the reference position with respect to the object, and
deforming a shape of an area other than the overlap area of the reference projection plane in accordance with a deformed shape of the overlap area.

10. The image processing apparatus according to claim 1, wherein the adjustment process is a projection plane deformation process of deforming a shape of a vertical cross section of the overlap area of the reference projection plane into a shape passing a side of the reference position with respect to the object and being a straight line parallel to the vertical direction, a straight line inclined in the vertical direction, a quadratic curve, or a square root curve.

11. The image processing apparatus according to claim 1, wherein the adjustment process is an image composite adjustment process of adjusting a position and a range of an image composite region defined in the overlap area of the reference projection plane so that the image composite region does not overlap with the object.

12. The image processing apparatus according to claim 11, wherein the image composite adjustment process is a process of adjusting a composite coefficient of adjacent ones of the plurality of captured images in the overlap area.

13. The image processing apparatus according to claim 12, wherein the composite coefficient indicates a transparency value of the adjacent captured images.

14. The image processing apparatus according to claim 12, wherein the image composite adjustment process is a process causing the image composite region not to overlap with the object by:
  setting, to a first value, the composite coefficient in a region which is other than the image composite region within the overlap area and a region onto which one of the adjacent captured images is projected,
  setting, to a second value differing from the first value, the composite coefficient in a region which is other than the image composite region within the overlap area and a region onto which the other of the adjacent captured images is projected, and
  setting, to an intermediate value between the first value and the second value, the composite coefficient in the image composite region within the overlap area.

15. An image processing method implemented by a computer, the image processing method comprising:
  acquiring a plurality of captured images whose capturing areas overlap with one another;
  determining whether an object is included in an overlap portion of adjacent ones of the plurality of captured images in a projected image, the projected image being obtained by projecting the plurality of captured images onto a reference projection plane, the reference projection plane being an image projection plane virtually disposed in a virtual space corresponding to a real space; and
  performing an adjustment process on an overlap area of the reference projection plane, the overlap area including the object on the reference projection plane and corresponding to the overlap portion including the object,
  wherein the reference projection plane is the image projection plane which is virtually disposed in the virtual space and whose reference position is a central region of a bottom of the reference projection plane.

16. The image processing method according to claim 15, wherein the adjustment process is a projection plane deformation process of deforming a shape of the overlap area of the reference projection plane into a shape passing a side of the reference position with respect to the object.

17. The image processing method according to claim 15, wherein the adjustment process is an image composite adjustment process of adjusting a position and a range of an image composite region defined in the overlap area of the reference projection plane so that the image composite region does not overlap with the object.

18. A non-transitory computer-readable recording medium on which a program executable by a computer is recorded, the program instructing the computer to perform a process including:
  acquiring a plurality of captured images whose capturing areas overlap with one another;
  determining whether an object is included in an overlap portion of adjacent ones of the plurality of captured images in a projected image, the projected image being obtained by projecting the plurality of e captured images onto a reference projection plane, the reference projection plane being an image projection plane virtually disposed in a virtual space corresponding to a real space; and
  performing an adjustment process on an overlap area of the reference projection plane, the overlap area including the object on the reference projection plane and corresponding to the overlap portion including the object,
  wherein the reference projection plane is the image projection plane which is virtually disposed in the virtual space and whose reference position is a central region of a bottom of the reference projection plane.

* * * * *